(12) United States Patent
Ballandras et al.

(10) Patent No.: US 8,393,224 B2
(45) Date of Patent: Mar. 12, 2013

(54) STRESS GAUGE HAVING AN ACOUSTIC RESONANT STRUCTURE AND SENSOR FOR AT LEAST ONE PHYSICAL PARAMETER USING SUCH STRESS GAUGE

(75) Inventors: Sylvain Jean Ballandras, Besancon (FR); Jérérmy Masson, Avanne-Aveney (FR)

(73) Assignees: Centre National de la Recherche Scientifique, Paris (FR); Senseor, Mougins (FR); Universite de Franche-Comte, Besancon Cedex (FR)

( * ) Notice: Subject to any disclaimer, the term of this patent is extended or adjusted under 35 U.S.C. 154(b) by 131 days.

(21) Appl. No.: 12/669,256

(22) PCT Filed: Jul. 18, 2008

(86) PCT No.: PCT/EP2008/059447
§ 371 (c)(1),
(2), (4) Date: Oct. 11, 2010

(87) PCT Pub. No.: WO2009/013235
PCT Pub. Date: Jan. 29, 2009

(65) Prior Publication Data
US 2011/0132098 A1 Jun. 9, 2011

(30) Foreign Application Priority Data
Jul. 20, 2007 (FR) .................................. 07 56653

(51) Int. Cl.
*G01L 1/00* (2006.01)
(52) U.S. Cl. .......................................... 73/778
(58) Field of Classification Search ............. 73/778; 333/187
See application file for complete search history.

(56) References Cited

U.S. PATENT DOCUMENTS

| 4,479,070 A | 10/1984 | Frische et al. |
| 4,484,475 A | 11/1984 | Ogura et al. |

(Continued)

FOREIGN PATENT DOCUMENTS

| DE | 19625816 C1 | 1/1998 |
| EP | 0117387 A1 | 9/1984 |

(Continued)

OTHER PUBLICATIONS

Bigler, E.; et al, "Stree Sensitivity Coefficients: A General Approach for Bulk, Rayleigh and Surface Transverse Waves", IEEE International Frequency Control Symposium, Issue 50, pp. 422-429, 1996.

(Continued)

*Primary Examiner* — Lisa Caputo
*Assistant Examiner* — Octavia Davis-Hollington
(74) *Attorney, Agent, or Firm* — Pearne & Gordon LLP

(57) ABSTRACT

The invention relates to a stress gauge of the type having an acoustic resonant structure, including a piezoelectric transducer (10) connected to a holder (20), the holder (20) including opposite the piezoelectric transducer (10) an imbedded reflecting portion (40). The imbedded reflecting portion (40) reflects the volume acoustic waves generated by the piezoelectric transducer (10) when it is excited according to a harmonic mode of the structure and propagating into said holder (20), the reflecting portion (40) being arranged at a distance from the piezoelectric transducer (10) such that the integral of the stress on the propagation distance of the volume acoustic waves up to their reflection is different from zero.

27 Claims, 16 Drawing Sheets

U.S. PATENT DOCUMENTS

| | | | |
|---|---|---|---|
| 4,899,591 A * | 2/1990 | Kibblewhite | 73/761 |
| 5,682,000 A | 10/1997 | Okada | |
| 7,609,132 B2 * | 10/2009 | Ballandras et al. | 333/187 |

FOREIGN PATENT DOCUMENTS

| | | |
|---|---|---|
| EP | 0139495 A2 | 5/1985 |
| EP | 1748556 A1 | 1/2007 |
| FR | 2739925 A1 | 4/1997 |
| FR | 2776065 A1 | 9/1999 |
| GB | 1577692 A | 10/1980 |
| GB | 2265983 A | 10/1993 |

OTHER PUBLICATIONS

Ballandras, S., et al., "Surface-acoustic-wave devices with low sensitivity to mechanical and thermoelastic stresses", J. Applied Physics, vol. 72, Issue 8, pp. 3272-3281, Oct. 15, 1992.

Baumhauer, J.C.; et al., "Nonlinear electroelastic equations for small fields superposed on a bias", The Journal of the Acoustical Society of America, vol. 54, No. 4, pp. 1017-1034, 1973.

Mansfeld, G.D.; et al., "The Development of a New Class of Baw Microwave Acoustic Devices for Ecological Monitoring", IEEE Ultrasonics Symposium, vol. 1, pp. 909-912, 2002.

Sinha, B.K.; et al., "First Temperature derivatives of the fundamental elastic constants of quartz", J. Applied Physics, vol. 50, Issue 4, pp. 2732-2739, American Institute of Physics, Apr. 1979.

Thurston, R.N., "Wave Propagation in Fluids and Normal Solids", Ch. 1, pp. 1-110, Physical Acoustics: Principles and Methods, 1964.

Timoshenko, S.P., "Theory of Elasticity", Third Edition, Chapters 3, 6 & 11, pp. 35-64, 168-217, & 354-378, McGraw-Hill, Inc., 1970.

French Search Report for Appl. No. FR 0756653 dated Mar. 18, 2008.

* cited by examiner

STRESS GAUGE HAVING AN ACOUSTIC RESONANT STRUCTURE AND SENSOR FOR AT LEAST ONE PHYSICAL PARAMETER USING SUCH STRESS GAUGE

This application is a 371 of PCT/EP08/59447.

TECHNICAL FIELD

The present invention relates to the field of measuring stresses exerted on a mechanical system. More specifically, the present invention relates to a stress gauge of the type having an acoustic resonant structure.

STATE OF THE PRIOR ART

At present, to measure the stresses that are exerted in a part, a stress gauge, which may be a surface or bulk wave resonator, a piezoresistive element or any other means capable of converting a deformation of the stress gauge induced by the stress that is exerted in the part into an electric signal, is transferred onto said part.

For certain applications, such as the measurement of pressure, the latter applies directly on the bulk wave resonator, which takes the form of a diaphragm. Reference may be made to U.S. Pat. No. 4,479,070. Through a calibration, it is then possible to measure the value of the pressure that is exerted. A differential configuration nevertheless turns out to be necessary, which imposes a quite complex implementation including a reference device.

Hybrid acoustic resonant structures known under the acronym HBAR (harmonic bulk acoustic resonator) comprise, on a generally crystalline holder 1 able to propagate acoustic waves, made of silicon for example, a piezoelectric transducer 2 with two opposite electrodes 3, 4 sandwiching a thin leaf 5 of piezoelectric material. Reference may be made to FIG. 1. When the piezoelectric transducer is excited by the application of a radiofrequency field at the terminals of the dipole thereby formed, volume acoustic waves propagate into the holder in line with the piezoelectric transducer 2. The area of propagation 6 of the acoustic waves is a mechanical resonating area distinct of the piezoelectric transducer. The resonating structure thus includes, in addition to the piezoelectric transducer 2, the portion 6 of holder 1 in line with the piezoelectric transducer 2. These resonating structures appeared when it became known how to form piezoelectric layers of good quality on the surface of the substrate.

When the holder 1 is a beam built-in at one of its ends, it is possible to model the phenomenon that originates within the mechanical resonating area 6 of the holder 1 located in line with the piezoelectric transducer 2 by using the simplified model of the volume acoustic wave resonator working in longitudinal mode as illustrated in FIG. 2. The volume wave resonator represented is arranged in a mark x1, x2, x3. Said volume acoustic wave resonator comprises two opposite electrodes 7, 8 that fit tightly round a block of piezoelectric material. By applying a radiofrequency field at the terminals of the dipole thereby created, displacements of the block 9 are generated, along the axis x2 directed along the thickness of the block 9, depending on the couplings enabled by the crystalline orientation of its material. There is a resonance phenomenon of order n when the excitation frequency F corresponds to n times the phase velocity $1/s_1$ of the displacement created, divided by two times the thickness e of the block 9, i.e. $f=n/(2s_1 e)$. $s_1$ is also known as slowness of the longitudinal compression wave (from which follows the index 1) that propagates into the block of piezoelectric material along the axis x2. Depending on the excitation mode, it could also be the slowness of the transverse mode that is then written $s_t$. All the developments may be applied to this case in an identical manner, the displacement then being $u_3$ or $u_1$ for example.

In normal operating regime, it is then possible to carry out a harmonic analysis that leads, if the piezoelectricity is disregarded, to the following two equations:

$$\text{Dynamic } \rho \frac{\partial^2 u_2}{\partial t^2} = C_{22} \frac{\partial^2 u_2}{\partial x_2^2} \quad (1)$$

Displacement field $$u_2 = \sum_{r=1}^{n} u_2^{(r)} e^{-j\omega s_2^{(r)} x_2} e^{j\omega t} \quad (2)$$

where $\rho$ designates the density of the piezoelectric material, $C_{22}$ is the elastic constant of the piezoelectric material along the axis x2 in contracted indices, $\omega$ is the pulsation of the wave that propagates along the axis x2 and $s^{(r)}_2$ represents the slowness of the mode in the piezoelectric material along the axis x2. The elastic constants with non-contracted indices are written $C_{i,j,k,l}$ with i, j, k and l varying from 1 to 3. The elastic constants with contracted indices are written $C_{I,J}$ varying from 1 to 6, I=9−i−j if i≠j and I=i=j if i=j and J=9−k−l if k≠l and J=k=l if k=l.

The possible existence of propagation terms in the plane x1, x3 is moreover assumed, but they are considered as negligible in the described application.

The penetration of the wave into the piezoelectric material is rigorously described in the linear combination of several partial waves, the number r of which is between 1 and n. The summation is made in the displacement field equation.

Only two terms are needed to describe the displacement field distribution over the thickness e of the piezoelectric material. From equations (1) and (2), the following characteristic equation (3) may be written:

$$\sum_{r=1}^{n} \left( s_2^{(r)2} - \frac{\rho}{C_{22}} \right) \omega^2 u_2^{(r)} e^{-j\omega s_2^{(r)} x_2} e^{j\omega t} = 0 \quad (3)$$

As a function of the thickness e of the piezoelectric material, the slowness $s^{(r)}_2$ is expressed as follows:

$$s_2^{(r)} = \pm \sqrt{\frac{\rho}{C_{22}}} = \pm s_l \quad (4)$$

For n=2, $s^{(r)}_2 = \pm s_1$ is deduced. The amplitude of the displacement field is obtained by applying the conditions at the surface limits, in other words in the absence of dynamic stresses along $x2=\pm e/2$. If the only normal stress on the surface of the wafer is taken into account, the following equation may be written:

$$T_{22}(\pm e/2) = 0 \rightarrow C_{22} \frac{\partial u_2}{\partial x_2}(\pm e/2) = 0 \quad (5)$$

By applying the conditions of equation (5), taking into account equation (2) of the displacement field modified by equation (3), the following system of equations is obtained after eliminating the factor terms (jωe).

$$\begin{bmatrix} -e^{-j\omega s_l e} & +e^{+j\omega s_l e} \\ -e^{+j\omega s_l e} & +e^{-j\omega s_l e} \end{bmatrix} \begin{Bmatrix} u_2^{(1)} \\ u_2^{(2)} \end{Bmatrix} = \begin{Bmatrix} 0 \\ 0 \end{Bmatrix} \to \Delta = 2j\sin(\omega s_l e) \quad (6)$$

The discriminant $\Delta$ of the system equal to $2j\sin(\omega s_1 e)$ must be zero to prove the existence of a non trivial solution. This corresponds to $\omega_N = N\pi/s_1 e$, where N is any whole number. It is then deduced from this that $u_2^1 = u_2^{(2)}$.

The displacement field $u_2$ is then such that $$u_2 = 2A\cos(\omega_N s_1 x_2) \quad (7)$$

A is the amplitude of the propagation mode and said amplitude is fixed by the excitation source. The result holds for all possible harmonics of order N and thus the distribution of the displacement field along the thickness of the wafer is governed by the same law, whatever the order N of the considered harmonic.

The information of sensitivity to the stress obtained by means of a volume wave model in fundamental mode remains valid for higher order harmonics.

From what has just been described, the calculation of the sensitivity to the stress of the resonating structure is based on a perturbations model, for which numerous references exist. Reference may be made for example to "Wave propagation in fluids and solids" by R. N. Thurston in Physical Acoustics, vol. 1, W. P. Mason Edition Academic Press, 1964 for the description of the base equations.

The energy balance equation of the resonating structure is given by the Lagrangian of the structure expressed in relation to the material coordinates $a_i$, again known as Lagrangian, as explained in the reference cited above.

To determine the sensitivity of the propagation mode to the effects of stresses, the difference between the Lagrangian of the initial regime without stress and the Lagrangian of the final regime with perturbation induced by the stress is calculated. By assuming the perturbed dynamic field uniform with the initial field without perturbation, which is a conventional hypothesis of linearization around an operating point, the perturbation induced by the stress on the operating point will be disregarded and thus it is assumed that only the frequency varies to the order 1.

The perturbation model used is described in the article of J. C Baumhauer, H. F Tiersten, J. Acoust. Soc. Am., vol. 54, page 1017 and following pages and its application to bulk waves detailed in the article of B. K Sihna, H. F Tiersten, "First derivatives of the fundamental elastic constants of quartz", J. of Applied Physics, vol. 50, n°4, page 2732 and following pages, 1979.

The Lagrangian of the initial regime is expressed by:

$$\int\int_\Omega\int\left(-\rho_0\omega_0^2 u_i^0 \delta u_i^* + \frac{\partial \delta u_i^*}{\partial a_j}C_{ijkl}\frac{\partial u_l^0}{\partial a_k}\right)dV = \int\int_\Omega\int \delta u_i^* F_i^0 dV + \int_\Gamma\int \delta u_i^* T_{ij}^0 n_j dS \quad (8)$$

The Lagrangian of the final regime is expressed by:

$$\int\int_\Omega\int\left(-\rho_0\omega^2 u_i \delta u_i^{0*} + \frac{\partial \delta u_i^{0*}}{\partial a_j}\overline{A}_{ijkl}\frac{\partial u_l}{\partial a_k}\right)dV = \int\int_\Omega\int \delta u_i^{0*} F_i dV + \int_\Gamma\int \delta u_i^{0*} T_{ij} n_j dS \quad (9)$$

In equations (8) and (9), $\rho_0$ represents the density at the initial non-perturbed state, $C_{i,j,k,l}$ the elastic constants in developed indices, defined by the well known Hooke relation $T_{i,j}=C_{i,j,k,l}\cdot S_{k,l}$ with $T_{i,j}$ the stresses and $S_{k,l}$ the linear deformations. $\Omega$ represents the integration volume and V the associated integration variable, $\Gamma$ represents the surface delimiting the resonator and S the associated integration variable, $\delta u_i$ the variational unknown or virtual work and $\partial u_i/\partial a_j$ the dynamic displacement gradient, $F_i$ the volume forces and $n_j$ the normal to the surface $\Gamma$. The upper index 0 denotes the non-perturbed fields and constants and the exponent * denotes the complex conjugation. The term $\overline{A}_{ijkl}$ is the tensor of perturbed elastic stresses such that $\overline{A}_{ijkl}=C_{ijkl}+\overline{H}_{ijkl}$ where $\overline{H}_{ijkl}$ represents the tensor of the perturbations, the bar taking account of static terms induced by the perturbation.

The difference between equations (8) and (7) gives:

$$\frac{\omega - \omega_0}{\omega_0} = \frac{\Delta\omega}{\omega_0} = \frac{\int\int_\Omega\int\left(\frac{\partial u_i^{0*}}{\partial a_j}\overline{H}_{ijkl}\frac{\partial u_l^0}{\partial a_k}\right)dV}{2\rho_0\omega_0^2 \int\int_\Omega\int u_m^{0*} u_m^0 dV} \quad (10)$$

The perturbation tensor is:

$$\overline{H}_{ijkl} = \delta_{ik}\overline{T}_{jl} + C_{ijkluv}\overline{S}_{uv} + C_{pjkl}\frac{\partial \overline{u}_i}{\partial a_p} + C_{ijql}\frac{\partial \overline{u}_k}{\partial a_q} + \frac{dC_{ijkl}}{d\theta}(\theta - \theta_0) \quad (11)$$

where the bar takes account of static terms induced by the perturbation, $\theta$ and $\theta_0$ represent respectively the operating temperature and a reference temperature, $\delta_{ik}$ is the Kronecker tensor, $C_{ijkluv}$ is the tensor of non linear elastic constants, $$\overline{T}_{jl}, \overline{S}_{uv}\ et\ \frac{\partial \overline{u}_i}{\partial a_p}$$

represent respectively the stresses induced by the deformation, the linear deformations induced by the stress, and the static displacement gradients induced by the stress. The Lagrangian coordinates $a_i$ are here merged with the Eulerian coordinates $x_i$.

The calculation of the coefficients of sensitivity to the stresses is made in assuming that the operating temperature $\theta$ is equal to the reference temperature $\theta_0$. From equations (7) and (10) for a unit integration surface, the following expression (12) is deduced expressing the relative frequency variation:

$$\frac{\Delta\omega}{\omega_N} = \frac{\int\int_\Omega\int\left(\frac{\partial u_2^{0*}}{\partial x_2}\overline{H}_{2222}(x_1, x_2, x_3)\frac{\partial u_2^0}{\partial x_2}\right)dV}{2\rho_0\omega_N^2 \int\int_\Omega\int u_2^{0*} u_2^0 dV}$$

$$= \frac{\int_{-\frac{1}{2}}^{+\frac{1}{2}}\int_{-\frac{1}{2}}^{+\frac{1}{2}}\int_{-e/2}^{+e/2} s_l^2 \sin^2(\omega s_l x_2)\overline{H}_{2222}(x_1, x_2, x_3)dx_1 dx_2 dx_3}{2\rho_0 \int_{-\frac{1}{2}}^{+\frac{1}{2}}\int_{-\frac{1}{2}}^{+\frac{1}{2}}\int_{-e/2}^{+e/2} \cos^2(\omega s_l x_2)dx_1 dx_2 dx_3} \quad (12)$$

In a regime of stresses of low intensities, the deformations are small and the calculation of the integral of the numerator of the expression 12 is made by simplifying the expression of the perturbation tensor and by assimilating the displacement gradients with the deformations. According to the article "Stress sensitivity coefficients: a general approach for bulk, Rayleigh and surface transverse waves" E. Bigler, S. Ballandras, Proc. Of IEEE IFCS, Honolulu (USA), June 1996, it may be established that:

$$\overline{H}_{ijkl} = (\delta_{ik}\delta_{js}\delta_{lt} + C_{ijklu}s_{uvst} + C_{pjkl}s_{ipkl} + C_{ijqlskqst})\overline{T}_{st} = K_{ijklst}\overline{T}_{st} \quad (13)$$

With $s_{ijkl}$ representing the compliances, in other words the inverse to the tensorial direction of the coefficients of elasticity $C_{ijkl}$ and $S_{ij} = s_{ijkl}T_{kl}$.

For constant and uniform stresses in the medium where the wave propagates, the static terms of the integral (11) have the expression:

$$\frac{\Delta\omega}{\omega_N} = \frac{s_l^2}{2\rho_0}K_{2222st}\overline{T}_{st} = {}^s\alpha_{st} \cdot \overline{T}_{st} \quad (14)$$

where ${}^s\alpha_{st}$ represent the coefficient of sensitivity to the stresses of the frequency.

For isotropic holders, but also for materials with high symmetry such as silicon (100), it may be shown that the $K_{2222st}$ for which s=t are zero. A numerical calculation shows that in the case of monocrystalline silicon, $K_{222211} = K_{222233} = -1.45$ and $K_{222222} = -0.86$. With a slowness of the compression mode of $1.184 \cdot 10^{-4}$ s/m, i.e. a phase velocity of 8441 m/s and a density of 2330 kg/m³, coefficients of sensitivity to the stresses are obtained, for silicon, ${}^s\alpha_{11} = -4.37 \cdot 10^{-12}$ Pa$^{-1}$ and ${}^s\alpha_{22} = -2.6 \cdot 10^{-12}$ Pa$^{-1}$. For a stress of the order of MPa, frequency variations of several parts per million, i.e. of the order of 1 to 3 kHz at 443 MHz are obtained, whatever the order of the harmonic considered.

Returning to the case of a built-in beam in flexure, it is possible to use the works of S. Timoshenko and R. Goodier in "Theory of elasticity", Mc Graw-Hill Edition, 3rd Edition, 1970, to model the static effects in beam type forms and of S. Ballandras, E. Bigler: "Surface acoustic wave devices with low sensitivity to mechanical and thermoelastic stresses", Journal of Applied Physics, vol. 72, n°88, pages 3272-3281, 1992.

In a built-in beam in flexure such as that illustrated in FIG. 2, the stress field in the beam is expressed by:

$$T_{11} = \frac{3F}{2e^3}x_1 x_2 \quad (15)$$

$$T_{12} = \frac{3F}{4e^3}(x_2^2 - e^2)$$

$$T_{22} = 0$$

Where F represents the stress force applied to the free end of the beam. By using only the first term, because there is no $\alpha_{12}$ coefficient in the case of an isotropic crystal or for silicon (100), a zero relative variation of pulsation or frequency is obtained, as indicated by the equalities (16):

$$\frac{\Delta\omega}{\omega_N} = \frac{s_l^2 K_{222211}\frac{3F}{2e^3}\int_{L-1}^{L+1}\int_{-e/2}^{+e/2}\sin^2(\omega s_l x_2)x_1 x_2\, dx_1\, dx_2}{2\rho_0 \int_{L-1}^{L+1} dx_1} \quad (16)$$

$$= \frac{Ls_l^2}{\rho_0}K_{222211}\frac{3F}{2e^3}\int_{-e/2}^{+e/2}\sin^2(\omega s_l x_2)x_2\, dx_2$$

$$= 0$$

L represents the length of the beam.

The relative variation of the resonance frequency induced by the application of a stress is zero, which clearly shows that a HBAR type acoustic resonant structure formed of a piezoelectric film transducer connected to a holder made of isotropic material such as silicon cannot serve as stress gauge. It is not sensitive to planar stresses.

When the stress is uniform over the thickness of the holder, a conventional HBAR resonant structure may serve as stress gauge.

If the beam were made from an anisotropic material, for example quartz, the measurement would be possible, but would not take such great advantage of the predominant stress terms, i.e. $T_{11}$.

DESCRIPTION OF THE INVENTION

The aim of the present invention is precisely to propose a stress gauge of the type having an acoustic resonant structure that has good sensitivity to planar forces that apply on the holder, whether the holder is made of an isotropic material or not.

To achieve this, the present invention proposes introducing a dissymmetry into the holder intended to be stressed by the stresses so as to limit in thickness the resonating portion to a single stress sign, compression or extension.

More specifically, the present invention is a stress gauge of the type having an acoustic resonant structure formed of a piezoelectric transducer connected to a holder on which the stress is applied, the holder including opposite the piezoelectric transducer an imbedded reflecting portion to reflect volume acoustic waves generated by the piezoelectric transducer when it is excited according to a harmonic mode of the structure, and that propagate into the holder and enter into resonance, said reflecting portion being arranged at a distance from the transducer such that the integral of the stress on the propagation distance of the waves up to their reflection is different from zero.

The holder comprises a median neutral fibre, the reflecting portion being situated, at the deepest, at the level of the median neutral fibre of the holder.

The median neutral fibre is situated at a depth in relation to a face of the holder on which is the piezoelectric transducer, the reflecting portion may be situated at a depth of around 80% of the depth of the median neutral fibre.

The holder may be made of silicon, langasite, langanite, langatate, lithium niobate, sapphire, gallium phosphate, lithium tantalate, diamond carbon, silicon carbide, glass, silicon oxide or even a metallic material such as stainless steel.

The piezoelectric transducer may be a piezoelectric film transducer or a conventional piezoelectric bulk wave transducer.

The piezoelectric transducer may be made of aluminium nitride, quartz, lithium niobate, lithium tantalate, potassium niobate, zinc oxide, langasite and derivatives thereof, gallium phosphate, gallium arsenide, gallium nitride, PZT, PMN-PT, and in a general manner from a piezoelectric material.

The reflecting portion may be a cavity, a Bragg mirror or a mirror reflecting the acoustic waves, whatever their incidence.

The reflecting portion is preferably given a size and a form substantially copied from those of the piezoelectric transducer.

The reflecting portion may have a thickness substantially equal to around ten percent of that of the holder at the level of the piezoelectric transducer.

The piezoelectric transducer may be crowned by an impedance matching layer to improve its electromechanical coupling.

The present invention also relates to a sensor of at least one physical parameter that comprises at least one stress gauge thereby characterised, the stress gauges sharing the same holder when the sensor comprises several of them.

When the sensor has at least two stress gauges, one may be subjected to an extension stress and the other to a compression stress, said two stress gauges being intended to be used to carry out a differential measurement so as to be compensated vis-à-vis sources of correlated perturbations such as a temperature variation for example.

At least one of the stress gauges known as reference gauge may be situated on an area of the holder subjected to substantially no stress.

The holder may be a beam, a membrane, a nail, a leaf.

When the holder is a nail, formed of a stem surmounted by a head provided with anchoring points that have a given position in relation to the stem at rest and which keep this position when the stem is stressed, a stress gauge may be arranged on the head in the vicinity of the stem or anchoring points.

The holder may be a beam built-in at one end and connected to a seismic mass at the other end.

At least one stress gauge may be connected to an antenna.

Two stress gauges may share a same reflecting portion inserted between two piezoelectric transducers.

The sensor may further comprise, connected to the holder, a temperature sensor.

The physical parameter may be a force, a pressure, a torque, an acceleration, a gyroscopic effect, and in certain cases in addition a temperature.

The present invention also relates to a method of manufacturing a stress gauge comprising the putting in place of at least one piezoelectric transducer on a holder and the formation within the holder of at least one reflecting portion opposite the piezoelectric transducer, to reflect volume acoustic waves generated by the piezoelectric transducer when the sensor is stressed, the reflecting portion being imbedded in the holder so that the integral of the stress on the propagation distance of the volume acoustic waves up to their reflection is different from zero.

The holder may be formed by the assembly of a first substrate with a second substrate, the reflecting portion being formed on or in the first substrate before assembly, so that it is at the interface between the two substrates after assembly, the second substrate bearing the piezoelectric transducer.

When the reflecting portion is a cavity, it may be etched in the first substrate.

The assembly may be a bonding with adhesive, an anodic bonding, a bonding by thermo-compression of a ductile layer, a molecular bonding, a bonding by electroforming.

The first substrate may advantageously be a silicon on insulator substrate with an insulating layer sandwiched between two silicon layers of different thicknesses.

In this configuration, the holder may be delimited in part by machining of the thickest silicon layer and stopping on the insulating layer, which makes it possible to control its thickness with precision.

The reflecting portion may be put in place on the thinnest silicon layer.

When the holder is formed from a silicon on insulator substrate with an insulating layer sandwiched between two silicon layers of different thicknesses, the reflecting portion is formed within the insulating layer supported by the thickest silicon layer and the piezoelectric transducer is formed on the thinnest silicon layer, which is transferred onto the insulating layer.

BRIEF DESCRIPTION OF DRAWINGS

The present invention will be better understood on reading the description of embodiments given purely by way of indication and in no way limiting and by referring to the appended drawings, in which.

Identical, similar or equivalent parts of the different figures bear the same numerical references so as to make it easier to go from one figure to the next.

In order to make the figures easier to read, the different parts represented in the figures are not necessarily to the same scale.

DETAILED DESCRIPTION OF SPECIFIC EMBODIMENTS

Figure 3:
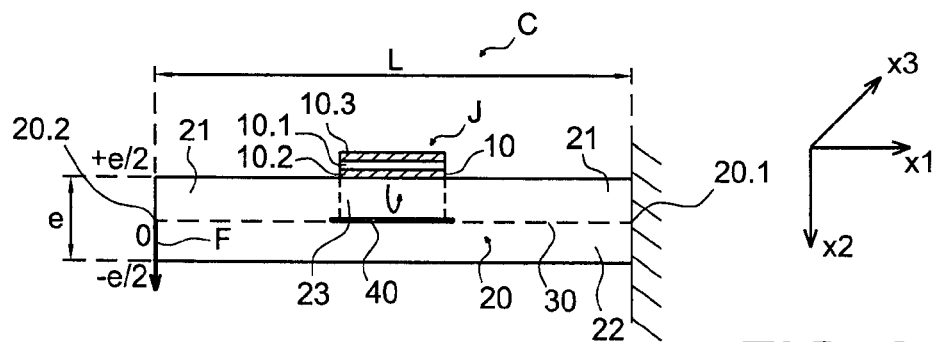
FIG. 3 shows a first example of a stress gauge according to the invention.

Reference will now be made to FIG. 3, which shows a stress gauge of the type having an acoustic resonant structure according to the invention. It is formed of a piezoelectric thin film transducer 10 connected to a holder 20. In the example described, the holder 20 is a beam built-in at one end 20.1 and having another free end 20.2 on which a stress force F applies. This stress force F directed along the axis x2 generates stresses in the beam 20 and perturbs the piezoelectric transducer 10. The axis x2 is directed towards the bottom in FIG. 3. The holder 20 may be made of a crystalline or amorphous material. This material may be isotropic or not. The material of the holder may be made of silicon, langasite and its derivatives, langanite and langatate, lithium niobate, sapphire, gallium phosphate, lithium tantalate, diamond carbon, silicon carbide, glass, silicon oxide or even of metal such as stainless steel.

Preferably, if the material employed for the holder 20 is crystalline, the crystallographic orientations of the crystalline material of the holder are chosen to optimise its sensitivity to the mechanical stresses of the volume mode. Sections may thus be sought for which all the coefficients $K_{2222st}$ are zero with the exception of one of them. Thus the stress gauge will only be sensitive to a single stress direction. For example $K_{222211} \neq 0$, $K_{222212} = 0$ and $K_{222222} = 0$ may be chosen.

If the material of the holder is not isotropic, the calculation of the sensitivity to the stresses of the stress gauge will be carried out with the simplified model described above, but while taking into account tensorial rotations required for the simulation of the real structure.

The piezoelectric transducer 10 may be made for example of aluminium nitride or quartz or instead lithium niobate, lithium tantalate, potassium niobate, zinc oxide, langasite and derivatives thereof, gallium phosphate, gallium arsenide, gallium nitride, PZT, PMN-PT, etc. It is deposited or transferred onto the propagation holder 20.

By a suitable choice of the material of the holder 20 and of that of the piezoelectric transducer and the thicknesses of these two parts, it is possible that the stress gauge with acoustic resonant structure has harmonics compensated for temperature variation effects, the stress gauge then only being sensitive to the effects of stresses. An advantageous choice is monocrystalline silicon for the holder 20 and aluminium nitride for the piezoelectric transducer 10.

The beam 20 has a length L and a thickness e. A measurement 0 is defined in the beam 20 at the level of a median neutral fibre 30, a measurement +e/2 at the level of a principal front face bearing the piezoelectric transducer 10 and a measurement −e/2 at the level of another principal face known as rear face opposite to the principal face bearing the piezoelectric transducer 10. Two regions 21, 22, situated on either side of the median neutral fibre 30, may thus be distinguished in the holder 20. The first extension stressed region 21 is located between the neutral fibre 30 and the front face, the second compression stressed region 22 is located between the neutral fibre 30 and the rear face of the beam 20. Extension stresses are generated in the first region 21 between the measurement 0 and the measurement +e/2 and compression stresses are generated in the second region 22 between the measurement 0 and the measurement −e/2.

In the example, the piezoelectric transducer 10 is a piezoelectric thin film transducer, with a thin film of piezoelectric material 10.1 sandwiched between two electrodes 10.2, 10.3. By associating it with the beam 20, a HBAR resonator structure is thereby formed. The electrode 10.2 is located against the holder 20 and the electrode 10.3 is on the surface.

When the transducer 10 is excited according to a harmonic mode of the structure, an electric field establishes itself between the electrodes 10.2, 10.3 and an acoustic wave originates and propagates from the piezoelectric transducer 10 up to the holder 20 parallel to the electric field, said acoustic wave enters into resonance in a portion 23 of the holder 20 situated in line with the piezoelectric transducer 10. When the beam is stressed by a force F, its elastic constants are affected by the stresses according to the laws described above in the prior art. The application of a stress on the beam does not condition the existence of the wave excited by the piezoelectric transducer but it modifies its properties, in particular its phase velocity and consequently its associated resonance frequency.

According to the invention, a reflecting portion 40 imbedded in the holder 20 is arranged in line with the piezoelectric transducer 10. Said reflecting portion 40 is represented as a cavity in FIG. 4, said cavity having a lower wall that reflects the acoustic waves propagating into the material of the holder 20. It limits the resonating portion 23. The piezoelectric transducer is not represented in FIG. 4. It is assumed that in FIG. 3 the reflecting portion is a mirror reflecting the waves, whatever their incidence, said mirror being known under the denomination of band-gap effect mirror or complete forbidden band effect mirror.

The presence of the reflecting portion 40 incorporated in the holder 20 limits the thickness of said resonating portion 23. The aim of this limitation is that the propagation of the acoustic waves only takes place in one of the two regions 21, 22, either the region in compression 22 or the region in extension but not both. The symmetry that existed for the propagation of the volume waves on the one hand in the region in extension and on the other hand in the region in compression is removed. In the example described, the resonating portion 23 is limited to the region in extension 21. If the piezoelectric transducer 10 was connected to the other principal face of the beam 20, all things being equal by themselves for the force F, the resonating portion 23 would be compression stressed.

The stress gauge can serve as force sensor to measure the force F applied, since the relative frequency variation induced by the application of the force is different from zero. In fact, in equation (16), the stress is integrated over the interval 0 to +e/2 (or 0 to −e/2) and no longer over the interval −e/2 to +e/2 as previously. The stress does not change sign over the distance covered by the acoustic wave from its origination up to its reflection at the level of the reflecting portion 40. Such a force sensor may comprise one or more stress gauges.

In this case, the expression (16) becomes:

$$\frac{\Delta \omega}{\omega_N} \approx \frac{Ls_l^2}{\rho_0} K_{222211} \frac{3F}{2e^3} \int_0^{+e} \sin^2(\omega s_l x_2) x_2 \, dx_2 \qquad (17)$$
$$= \frac{Ls_l^2}{\rho_0} K_{222211} \frac{3F}{8e}.$$

The relative frequency variation $\Delta\omega/\omega_N$ depends on the direction of application of the force F, which makes it possible to know the direction of application of the force in addition to its module.

Figure 4:
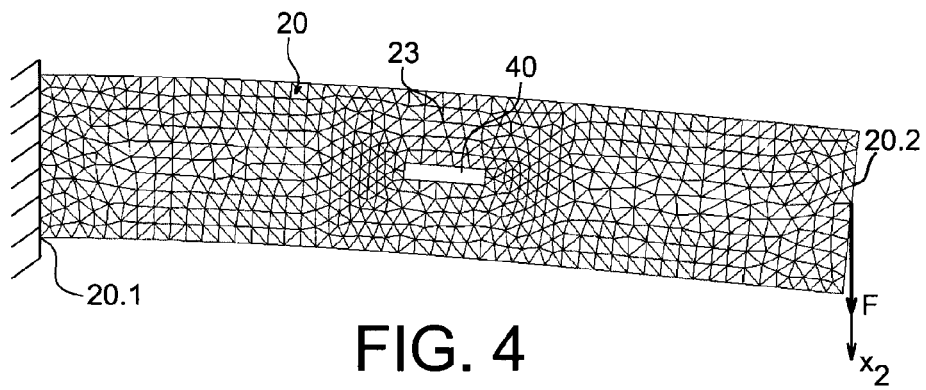
FIG. 4 shows in grid form an image of the deformation of a beam similar to that illustrated in FIG. 3.

In FIGS. 3 and 4 described, the reflecting portion 40 has been arranged at the level of the neutral fibre 30, but this is not an obligation. This position is the furthest position that it can take in relation to the piezoelectric transducer 10. It could be brought closer to the piezoelectric transducer (as in FIG. 6) and the resonating portion 23 would be limited in thickness to a fraction of the thickness of one of the extension or compression stressed regions 21, 22. What counts is that the stress in the resonating portion 23 covered by the acoustic wave always conserves the same sign. The reflecting portion could thus be brought closer by around 20% in relation to the piezoelectric transducer 10.

FIG. 4 is a grid of the beam of FIG. 3 subjected to a force of $10^4$ Pa applied to its free end along the axis x2. This grid reflects the deformation of the beam, it may be seen that this deformation is uniform in the resonating portion 23.

Figure 5:
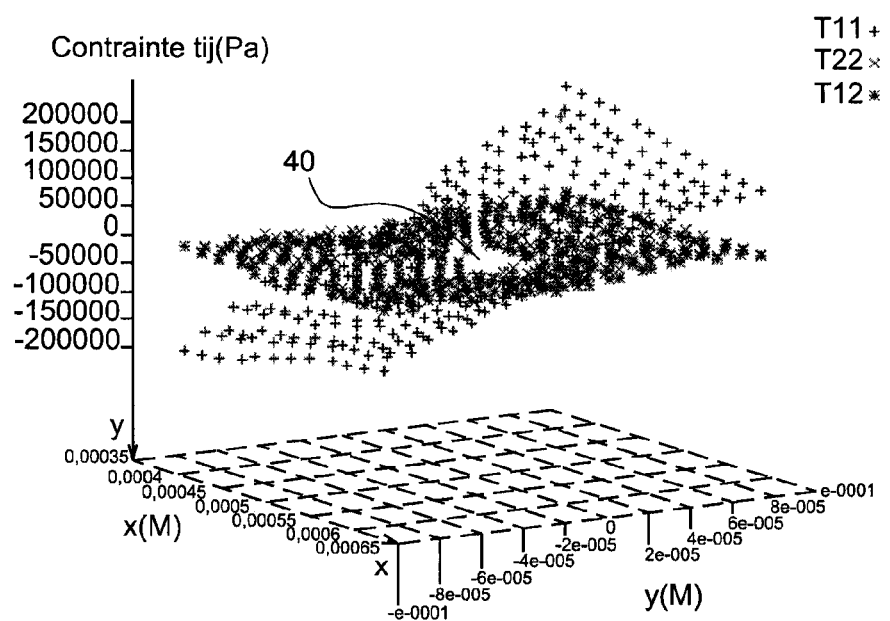
FIG. 5 illustrates the distribution of the stresses in the vicinity of the imbedded reflecting portion in the beam of FIG. 4.

FIG. 5 shows the distribution of the stresses particularly in the vicinity of the reflecting portion 40. In the vicinity of the reflecting portion 40, the preponderant stress term is $T_{11}$ and its sign is positive for the positive y (corresponding to x2 in the previous model, see equations (1) to (17)) and negative for the negative y.

Figure 6:
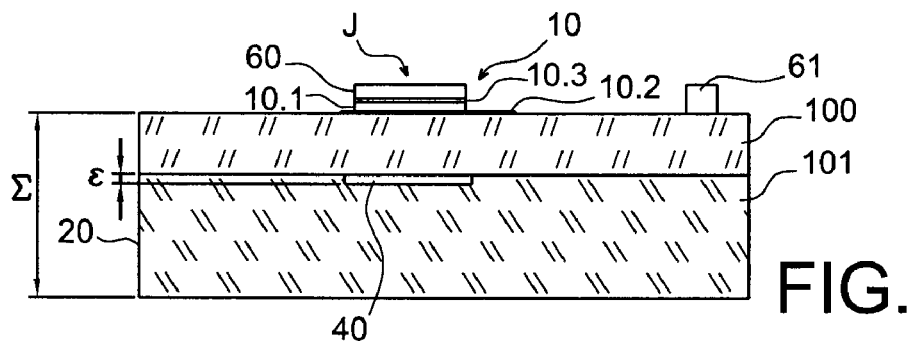
FIG. 6 shows another example of stress gauge according to the invention.

Reference is made to FIG. 6, which makes it possible to describe a method of forming a stress gauge according to the invention. FIG. 6 can also illustrate a sensor of at least one physical variable according to the invention with a single stress gauge. Thanks to the stress gauge, the measured physical variable may be a force. The stress gauge in itself is not referenced. It has a leaf-shaped holder 20. It comprises two substrates 100, 101 assembled to each other and more specifically a first substrate for example made of crystalline material 100 onto which is transferred the piezoelectric transducer 10 and a second substrate for example made of crystalline material 101 that bears the reflecting portion 40. The reflecting portion 40 is located at the interface between the first substrate 100 and the second substrate 101 after assembly. The reflecting portion 40 is a dish etched in the first substrate 100. The assembly between the two substrates 100, 101 may take place by bonding with epoxy adhesive for example, by anodic bonding, by thermo-compression of a ductile layer, for example made of gold, inserted between the two substrates 100, 101, by molecular bonding, or by any assembly means known in the microelectronics field. In an alternative, it is possible to grow by electroforming the lower substrate on the upper substrate.

It is possible that the stress gauge J, object of the invention, further comprises a layer for covering 60 the piezoelectric transducer 10. This, layer crowns the piezoelectric transducer 10, it covers the electrode 10.3 of the piezoelectric transducer 10 opposite to that 10.2 which is located on the side of the holder 20. Said covering layer 60, of appropriate thickness, serves as impedance match so as to improve the electromechanical coupling between the piezoelectric transducer 10 and the holder 20, and to limit the insertion losses. The covering layer 60 may be formed of a material from the list of possible materials for the holder 20. Preferably, it may be made from the material constituting the piezoelectric transducer 10. Reference may be made to patent application FR-A-2 889 375, which discloses a hybrid acoustic resonant structure with this impedance matching layer.

Figure 8A:
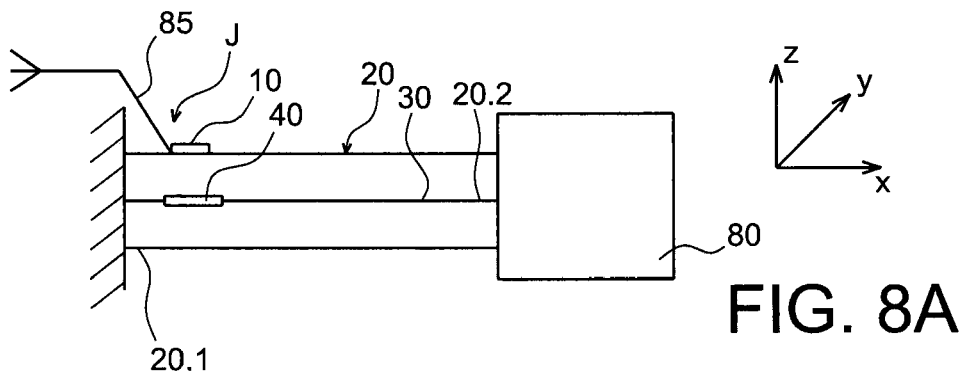
FIGS. 8A, 8B show alternatives of sensors according to the invention able to measure accelerations.
Figure 9A:
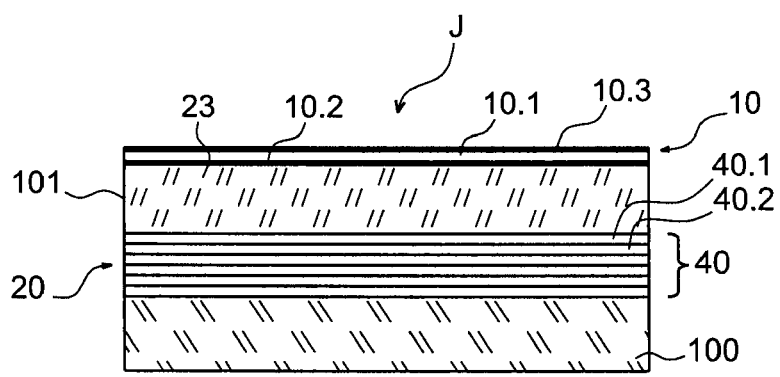
FIG. 9A shows an example of stress gauge according to the invention wherein the reflecting portion is a Bragg mirror and FIG. 9B illustrates a stress gauge according to the invention of the type having an acoustic resonant structure comprising a conventional piezoelectric bulk wave transducer.
Figure 9B:
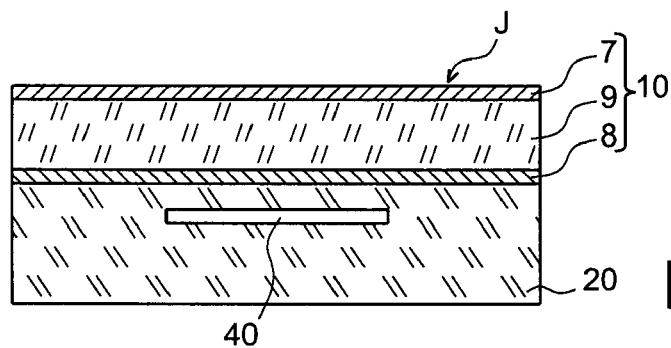

The reflecting portion 40 will be situated opposite the piezoelectric transducer 10. Its surface area will preferably be substantially equal to that of the covering of the piezoelectric transducer 10 on the holder 20, and homothetic by ratio 1 with it. It is obviously possible that its surface area is greater than the coverage of the piezoelectric transducer 10 as illustrated in FIG. 8A. It may however be imagined that it is smaller, as illustrated in FIG. 9B.

The reflecting portion 40 will have a sufficient thickness ϵ so that the acoustic wave that originates in the piezoelectric transducer 10 is well reflected so that it does not propagate into the material of the underlying holder 20, in other words into the second substrate 101. Its thickness ϵ must be such that the acoustic wave only propagates into one of the extension stressed or instead compression stressed regions and that it does not penetrate into the other. The first substrate 100 may correspond to the extension stressed region and the second substrate 101 correspond to the compression stressed region.

In FIG. 6, the two substrates 100, 101 do not have the same thickness, so that the bottom of the dish forming the reflecting portion 40 is localised in one of the stressed areas. The reflecting portion could have been localised at the level of the neutral fibre without encroaching on the other stressed area. The thickness s-of the reflecting portion 40 will be less than the half-thickness Σ/2 of the holder 20 but preferentially less than around 10% of the thickness Σ of the holder 20. The lower the thickness ϵ of the reflecting portion 40, the more the holder 20 will behave in a homogeneous manner, which is desired.

In the configuration of FIG. 6, the second substrate 101 may serve as mechanical protection to the stress gauge, which enables its integration in systems in direct contact with the exterior environment as in pressure sensors for example.

The sensor of FIG. 6 has been provided with another sensor 61, which may be a temperature sensor. The sensor of FIG. 6 may then measure several physical variables, in the present case a temperature in addition to a force.

The sensor according to the invention may be brought back in a rigid manner onto the object accommodating the stresses to be measured, so that its holder is subjected to the stresses, without adversely affecting the correct operation of the piezoelectric transducer of the stress gauge.

It has been seen in FIG. 3 that the holder 20 could take the form of a beam. Other forms are possible, such as a membrane.

It is also possible to form a sensor of one or more physical variables by grouping together several stress gauges on a same holder.

Figure 7A:
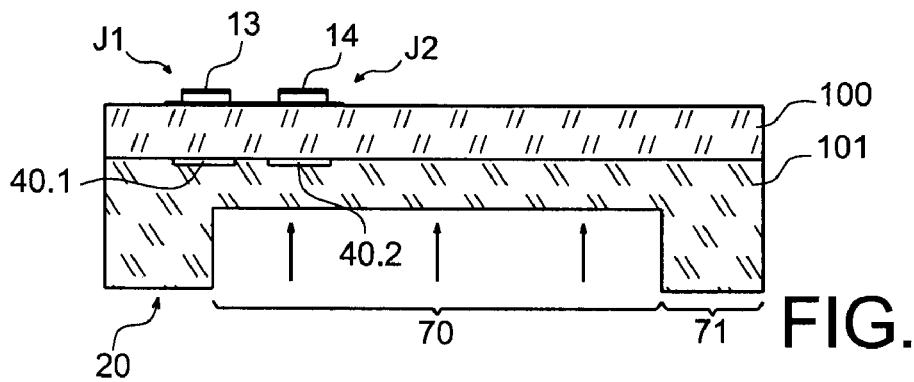
FIGS. 7A, 7B are two examples of pressure sensors according to the invention, able to measure pressures in a differential manner.
Figure 7B:
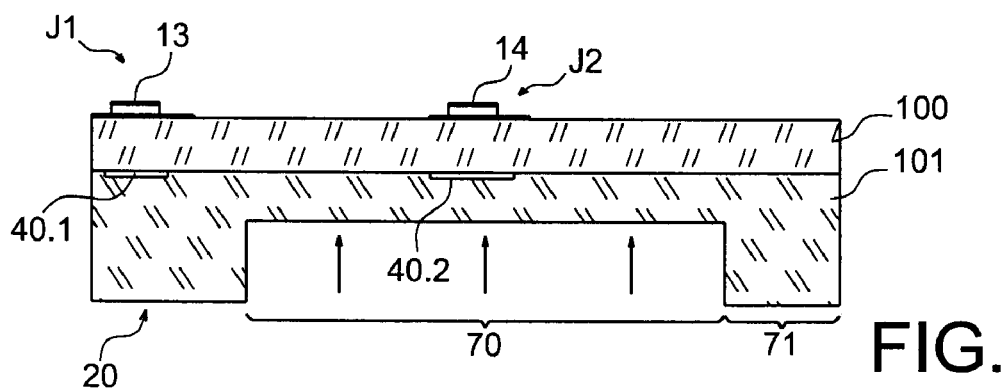

Reference is made to FIGS. 7A and 7B, which show two embodiments of a pressure sensor. In these figures, the holder is a membrane 20 that comprises a central portion 70 surrounded by an edge 71. The edge 71 has a greater thickness than the central portion 70. A substantially uniform hydrostatic pressure applies on the central part 70 of the membrane 20. Two stress gauges J1, J2 are represented. Their piezoelectric transducers are referenced 13 and 14, they cooperate with the membrane. They are arranged on the membrane 20 on one face opposite to that receiving the pressure.

In FIG. 7A, one of the stress gauges J2 is located at the level of the central area 70 and the other J1 encroaches upon the central area 70 and on the edge 71. In fact, the two stress gauges J1, J2 are arranged at places of the membrane where the stresses are of different types. In the membrane 20, the stresses are radial, in other words substantially parallel to its surface bearing the piezoelectric transducers 13, 14. The most central stress gauge J2 is subjected to radial extension stresses and the most external stress gauge J1 is subjected to radial compression stresses due to the greater thickness of the edge 71 than that of the central portion 70. With these two stress gauges J1, J2 and thus with two resonating structures i.e. two piezoelectric transducers 13, 14, the sensor can serve to carry out differential pressure measurements.

Opposite each of the piezoelectric transducers 13, 14 there is, within the membrane 20, a reflecting portion 40.1, 40.2 for the acoustic waves emitted when the associated piezoelectric transducer 13, 14 is excited according to a harmonic mode of the structure.

The resonance frequency of each of the piezoelectric transducers is given as a first approximation by the relation (14). In this case, the resonance frequencies of the two piezoelectric transducers 13, 14 are going to develop in two opposite directions. The sign of the stresses applied to each stress gauge J1, J2 being opposite and assuming that their module is the same, the differences of resonance frequencies is then representative of the effects due to the pressure alone and it is possible to dispense with sources of correlated perturbations such as the variation in the frequency due to the temperature in so far as the two piezoelectric transducers 13, 14 have substantially the same frequency variation coefficient as a function of temperature. The sensitivity of the measurement of the frequency is then two times greater than with a single stress gauge.

Here again the membrane 20 may be formed by the assembly of two substrates 100, 101, one of which referenced 100, less thick in its centre than at its edge, comprises the reflecting portions 40.1, 40.2 and the other of which, referenced 101, of substantially constant thickness, bears the piezoelectric transducers 13, 14.

In an alternative, as illustrated in FIG. 7B, it is possible that one of the stress gauges J1 is situated in an area of the membrane 20 insensitive to the effects of pressure that it receives. This area is located on the edge of the membrane 20. The stress gauge J1 arranged on the edge is described as reference stress gauge. The other stress gauge J2 is situated substantially in the central area of the membrane 20, where the stress is an extension. The reflecting portions 40.1', 40.2' are opposite the respective piezoelectric transducers 13', 14' as described previously.

The choice of the structure with reference stress gauge or with two stress gauges arranged in areas subjected to stresses of different type depend on the requirements definition that the sensor has to meet.

Figure 8B:
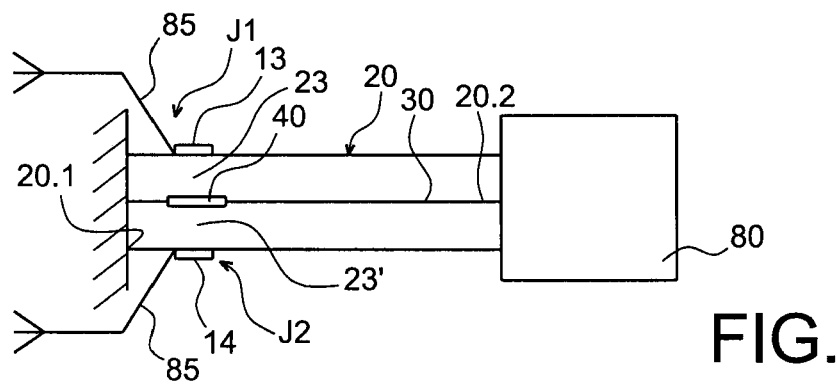

It is also possible to use the sensor of the invention as accelerometer. FIGS. 8A, 8B show such embodiments of accelerometers.

In this case, the holder 20 is a beam built-in at one end 20.1 and the other end 20.2 of which is free and connected to a seismic mass 80. The seismic mass 80 is a solid body charged with reacting to the variations in acceleration. It is considered that the neutral fibre 30 of the beam is included in the plane xoy, in the absence of acceleration. If the accelerometer undergoes an acceleration (along Oz), the seismic mass 80 due to its inertia decreases and the beam 20 undergoes a flexion. In the case of braking, it is the opposite phenomenon that takes place. To measure the acceleration or the braking, it thus suffices to identify the relative position of the seismic mass 80 in relation to the plane xoy. At least one stress gauge J is arranged on the beam 20, it is closer to the building-in than the seismic mass 80. It is aimed that its position is in an area of maximal stress of the beam 20. It is going to measure the stresses induced in the beam 20 in the vicinity of the building-in, which makes it possible to come back to the variations in acceleration undergone by the stress gauge of resonant type structure. In the example represented in FIG. 8A, if the sensor undergoes an acceleration, the stress gauge J is arranged in an extension stressed region of the beam 20. A reflecting portion 40 has been arranged in the beam 20 in line with the piezoelectric transducer 10.

The stress gauge J may be connected to a radiofrequency antenna 85, at the level of its piezoelectric transducer 10, the latter being remotely interrogated on the frequency variations that it measures. The sensor then functions as transponder.

It is possible to arrange several stress gauges J1, J2 on the beam 20 so as to obtain a differential accelerometer not very sensitive to undesirable perturbations such as temperature variations. In this configuration, the two piezoelectric transducers 13, 14 of the two stress gauges are arranged on the two opposite principal faces of the beam 20 and on either side of the reflecting portion 40. The reflecting portion 40 is located at the level of the neutral median fibre 30 of the beam 20. The two transducers 13, 14 are aligned with the reflecting portion 40. The two piezoelectric transducers 13, 14 cooperate with a same reflecting portion 40, because they are arranged opposite each other. The two stress gauges J1, J2 share the same reflecting portion 40, they are arranged back to back.

In the configuration of FIG. 8B, the flexing of the beam 20 in a given direction leads to the appearance of stresses of opposite signs in the two resonating portions 23, 23' that surround the reflecting portion 40. The two stress gauges J1, J2 are subjected to equal and opposite stresses and conforming to the formula (17), the frequency variations measured by the piezoelectric transducers 13, 14 will be equal and opposite. In this alternative as well, the two piezoelectric transducers 13, 14 are connected to an antenna 85. In the figure, two separate antennas have been represented but a single could have sufficed.

It may be envisaged that the stress gauge according to the invention is designed so as to minimise the influence of the temperature to which it is subjected.

The materials and the thicknesses on the one hand of the piezoelectric transducer 10 and the holder 20 on the other hand are chosen so as to take advantage of their contravariant thermo-elastic properties, for example by employing aluminium nitride as piezoelectric material and silicon for the holder. The thermal sensitivity coefficient of the stress gauge according to the invention and of the sensor that uses such a gauge is rendered substantially zero.

Instead of the reflecting portion 40 being formed by a cavity included within the holder 20, it is possible that it is formed by a Bragg mirror included within the holder 20. Reference may be made to FIG. 9A. The Bragg mirror 40 is imbedded in the holder 20 and is located, in the example described, substantially at a median depth compared to the total thickness of the holder 20. The piezoelectric transducer 10 is similar to those shown previously, with piezoelectric thin film. The Bragg mirror 40 conventionally comprises a stack of alternating layers 40.1, 40.2 having different reflection indices. The thickness of the layers 40.1, 40.2 is an uneven multiple of the quarter of the wavelength of the acoustic wave that propagates into the resonating portion 23. The successive reflections on the various layers 40.1, 40.2 create the mirror effect. An alternation of silicon oxide and silicon nitride layers may thus be used. The holder 20 is then formed of the Bragg mirror 40 sandwiched between two substrates 100, 101.

In an alternative illustrated in FIG. 9B, the stress gauge may comprise a conventional piezoelectric transducer 10 formed of a block of piezoelectric material 9, and in addition a film. Said block 9 being sandwiched between two electrodes 7, 8. This piezoelectric transducer 10 is connected, at the level of one of its electrodes 8, to a holder 20 provided with the imbedded reflecting portion 40. The depth of the reflecting portion 40 is chosen so that the integral of the stress in the resonating structure thereby formed is different from zero on the propagation distance of the wave.

Figure 10A:
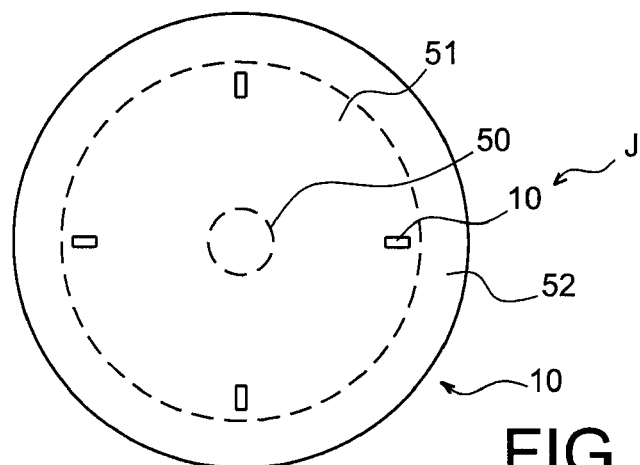
FIGS. 10A, 10B, 10C are examples of force sensor according to the invention in which the holder is a nail.
Figure 10B:
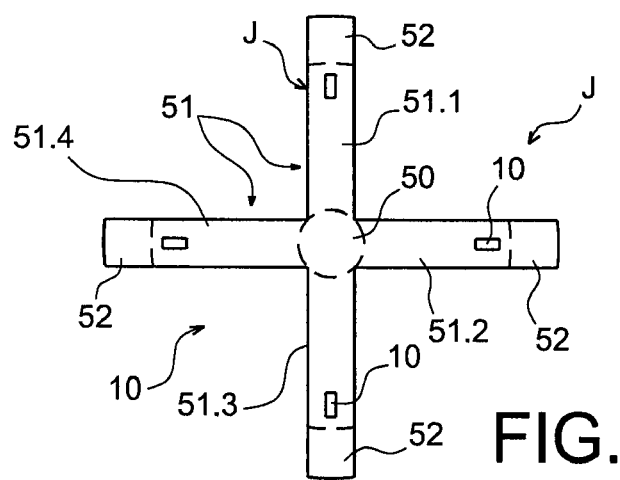
Figure 10C:
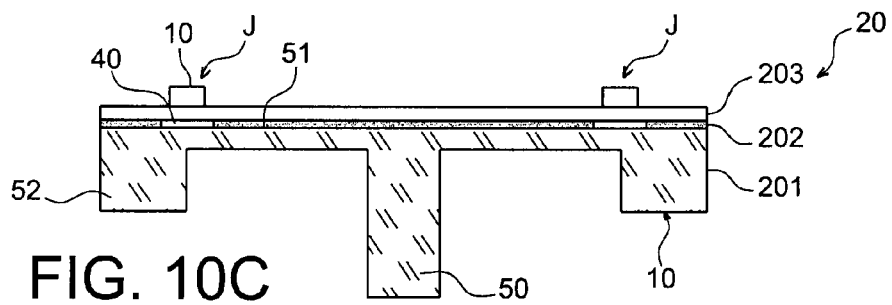

A sensor of at least one physical variable according to the invention, the holder 20 of which makes it possible to measure a field of complex stresses, will now be described. In this example, the sensor is a force sensor. Reference is made to FIGS. 10A, 10B, 10C, which show two alternatives of sensor, the holder of which takes the form of a nail. The nail comprises a stem 50 intended to be stressed by a force F and which is connected to a head 51 intended to be deformed or stressed when the stem 50 is stressed. The head 51 comprises anchoring points 52, which have a given position in relation to the stem 50 at rest and which keep this position when the stem 50 is stressed.

Reference may be made to European patent application EP-A-1 275 949, which describes this type of holder. The head 51 may take the form of a membrane, connected in its central portion with the stem 51 and the anchoring points 52 of which are on its periphery, as illustrated in FIG. 10A. In an alternative, it may be formed of arms 51.1, 51.2, 51.3, 51.4 connected together to one end and connected to the stem 50 at the level of said end as illustrated in FIG. 10B. The anchoring points 52 are then located at the other end of the arms 51.1, 51.2, 51.3, 51.4. The anchoring points 52 may be discrete as in FIG. 10A or continuous as in FIG. 10B.

FIG. 10C is a sectional view that can correspond to one or the other of the alternatives.

Several stress gauges J are spread out on the head 51. If the head 51 comprises arms, a stress gauge may be placed on each of the arms 51.1, 51.2, 51.3, 51.4. If the head is a membrane, several stress gauges J may be spread out in a substantially regular manner. The piezoelectric transducers 10 that compose the stress gauges J are arranged at its surface. According to the invention, a reflecting portion 40 is also arranged in line with each of the piezoelectric transducers 10, imbedded in the material of the head 51.

Figure 11A:
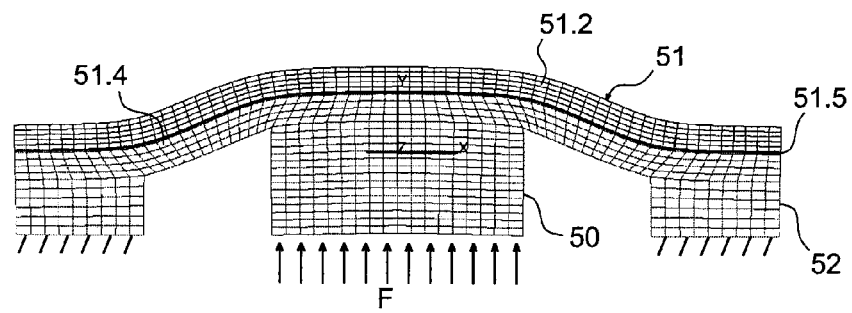
FIGS. 11A, 11B show the deformation of the nail type holder subjected to a force normal to the head and to a radial force in relation to the head.
Figure 11B:
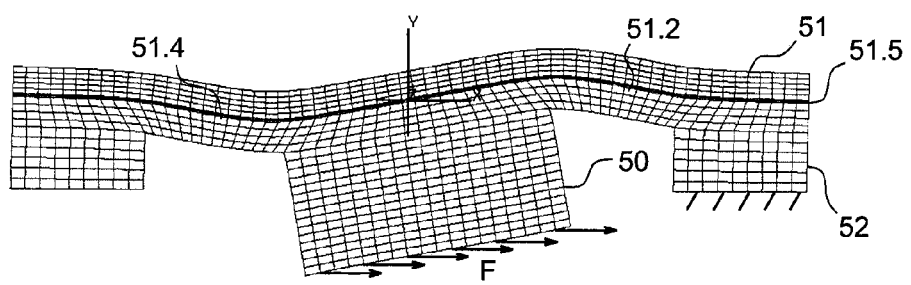

The piezoelectric transducers 10 and the reflecting portions 40 are arranged so that the stress gauges thereby formed are localised at points of high sensitivity to the stresses, in other words at points subjected to the most intense longitudinal stress. In FIGS. 11A, 11B are represented the finite elements meshing of the conventional nail type of holder 10 reflecting the deformations that apply therein when a force is applied on the stem 50 at the level of the heel of the nail. The force has a value of 2 N, which corresponds to a pressure of 2 KPa on the heel of the nail. It is assumed that the head 51 of the nail comprises arms 51.1 to 51.4 as in FIG. 10B and that the anchoring points 52 are at the level of the end of the arms opposite the stem 51. The stem 50 has a principal axis directed along the axis y. The holder 10 does not comprise a reflecting portion. In FIG. 11A, the forces are applied along the axis y, they are directed along the principal axis of the stem 50. In FIG. 11B, the forces are substantially normal to the principal axis of the stem 50. Each of the arms 51.1 to 51.4 behaves like a beam built-in at its two ends due to the fixation to the stem 50 and anchoring points 52. In the case of a membrane, the anchoring points may take the form of a crown.

In these figures, it will be noticed that the most stressed areas are those situated near the building-in points.

Figure 11C:
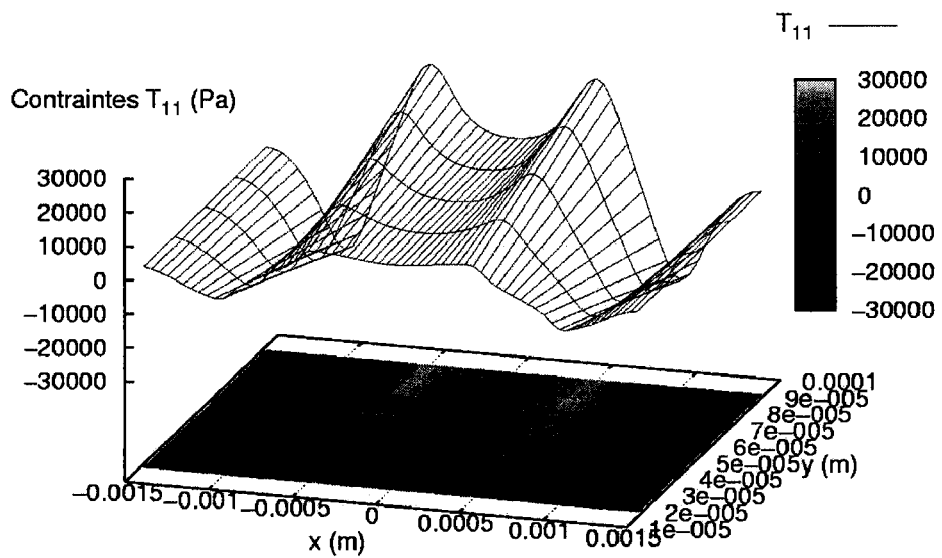
FIGS. 11C and 11D show the distribution of the stresses in the head of the nail of FIGS. 11A and 11B.
Figure 11D:
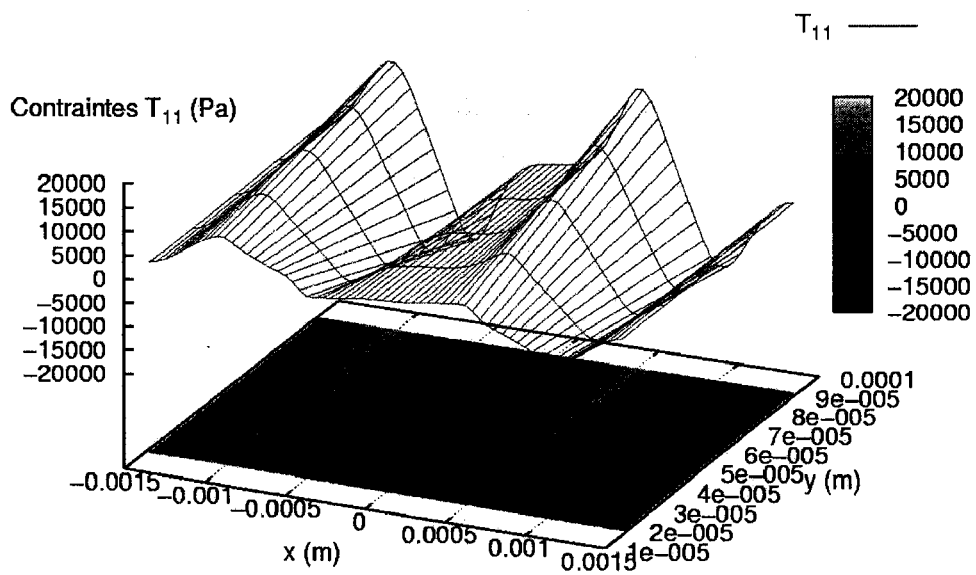

FIGS. 11C and 11D represent the stresses induced by the application of forces in the upper layer 51.5 of the head 51 of the nail. Said upper layer 51.5 is illustrated in dark in FIGS. 11A, 11B. The stress $T_{11}$ is preponderant and the stresses $T_{12}$ and $T_{22}$ may be disregarded. The piezoelectric transducers 10 and the reflecting portions 40, in other words the stress gauges J, may be arranged in the vicinity of the building-in points: in other words either near to the stem 50, or towards the periphery near to the anchoring points 52.

More specifically, the piezoelectric transducers 10 that are on the side of the stem 50 are situated partially in line with the stem 50 and those that are on the side of an anchoring point 52 are situated partially in line with an anchoring point 52. The same is true for the reflecting portions 40 since they are wedged opposite piezoelectric transducers 10.

Figure 12A:
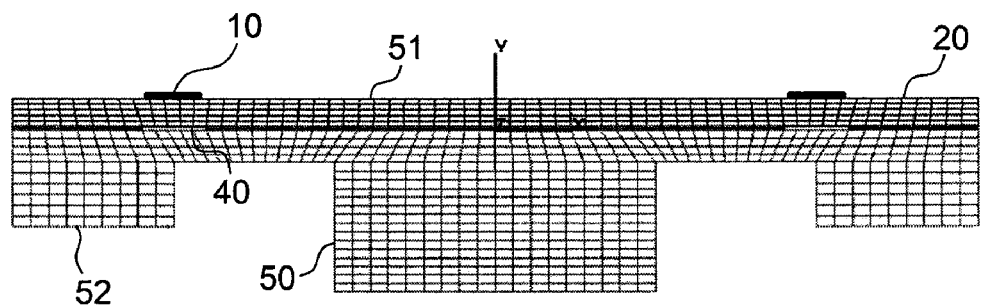
FIG. 12A shows the grid of the force sensor with nail type holder at rest, with its stress gauges in the vicinity of the anchoring points.
Figure 12B:
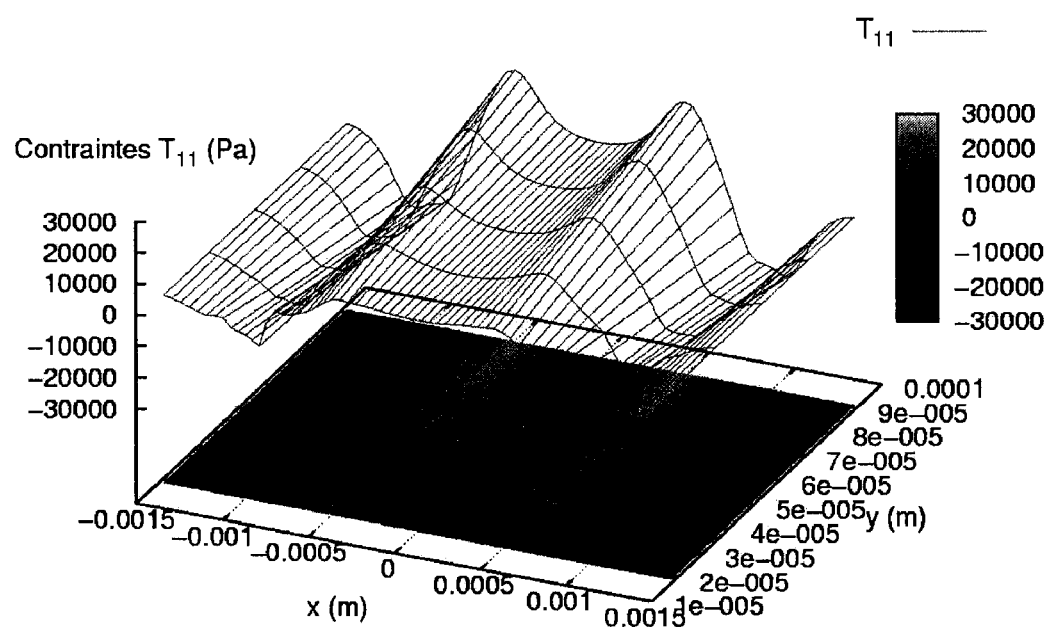
FIGS. 12B, 12C show the distribution of the stresses in the head of the nail of FIG. 12A, subjected to a force normal to the head, of positive sign and of negative sign.
Figure 12C:
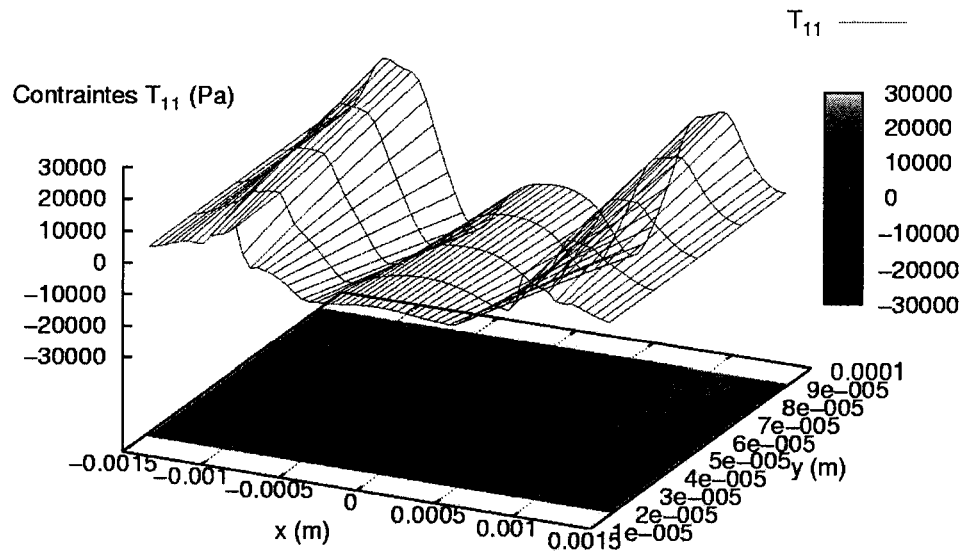
Figure 12D:
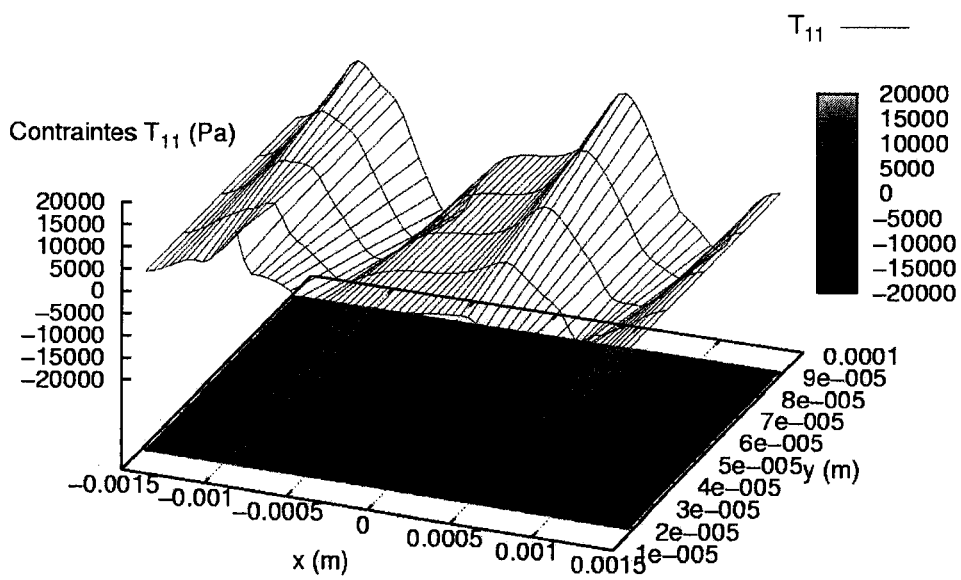
FIGS. 12D, 12E show the distribution of the stresses in the head of the nail of FIG. 12A, subjected to a radial force in relation to the head, of positive sign and of negative sign.
Figure 12E:
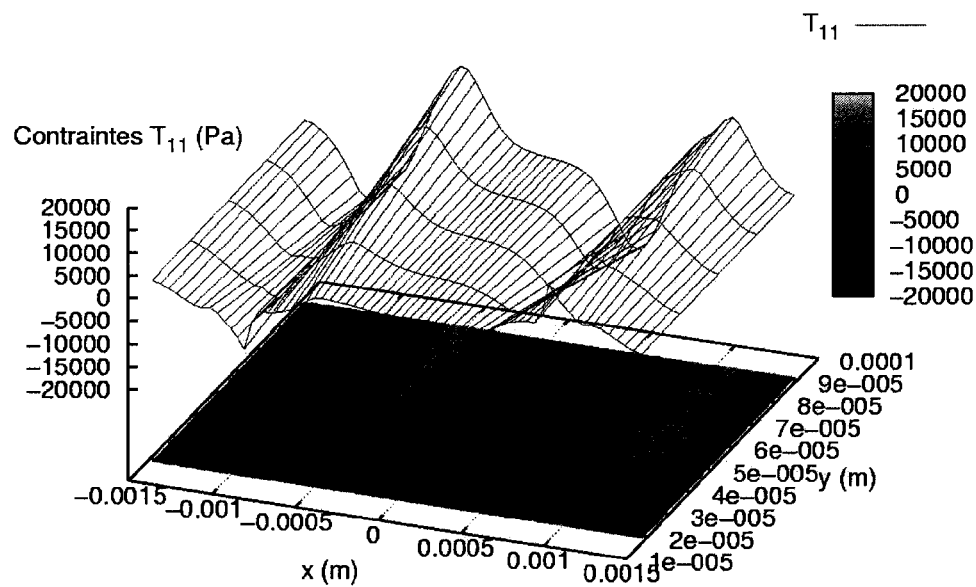

FIG. 12A shows a configuration of the force sensor according to the invention wherein the stress gauges J, in other words the piezoelectric transducers 10 and the reflecting portions 40 imbedded in the head, are situated near to the building-in points 52, they partially overhang them.

Figure 13A:
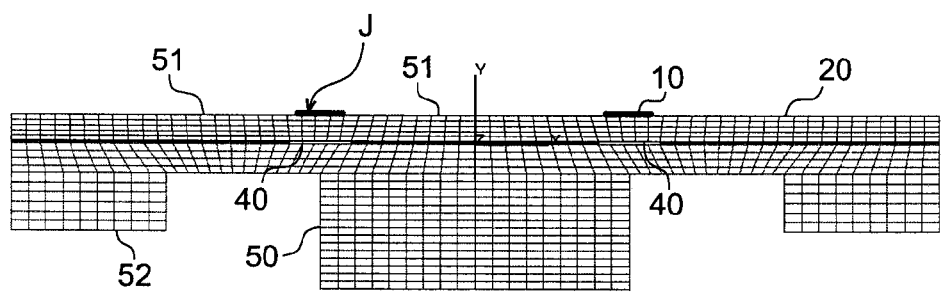
FIG. 13A shows the grid of the force sensor with nail type holder at rest, with its stress gauges in the vicinity of the stem.
Figure 13B:
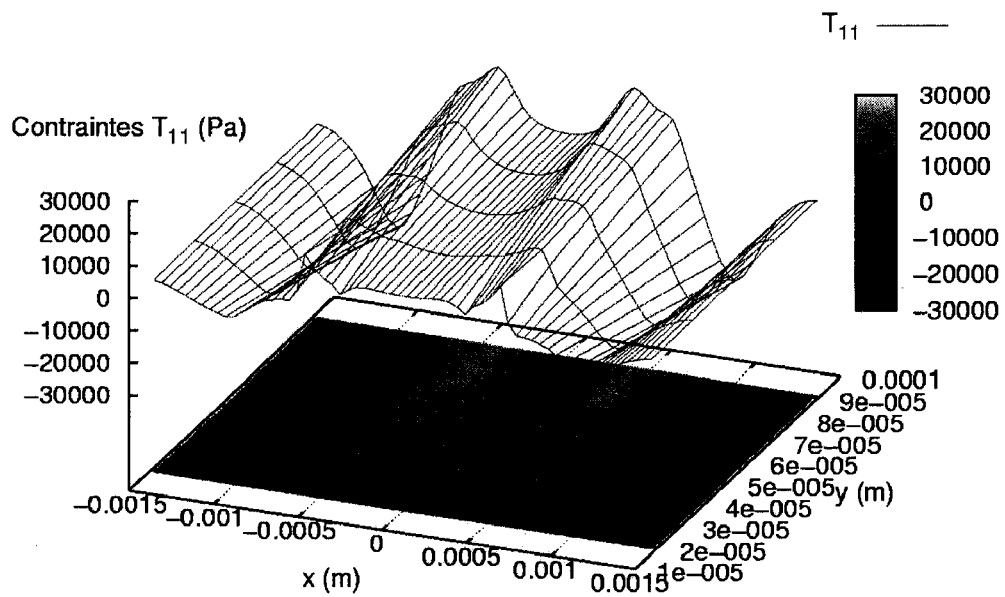
FIGS. 13B, 13C show the distribution of the stresses in the head of the nail of FIG. 13A, subjected to a force normal to the head, of positive sign and of negative sign.
Figure 13C:
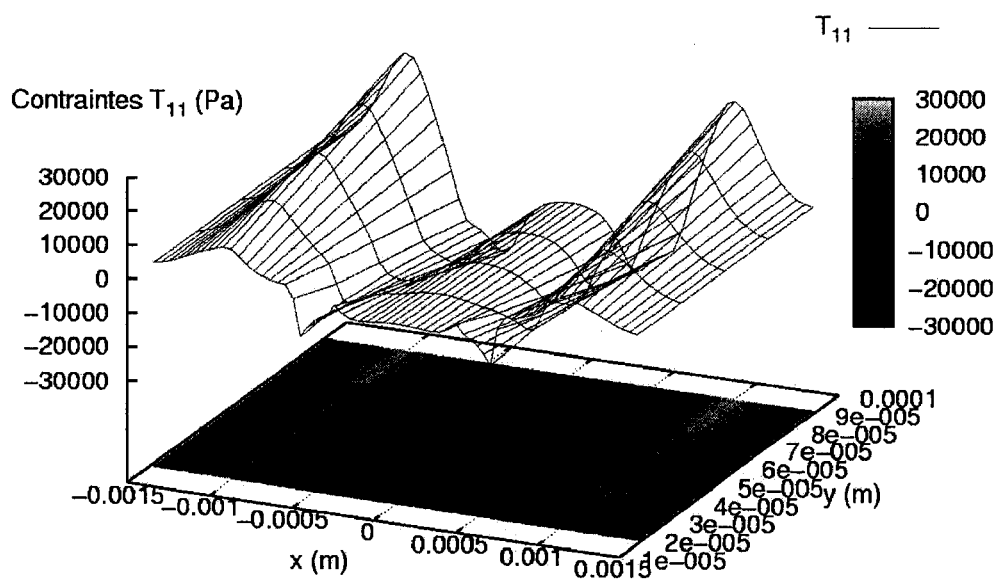
Figure 13D:
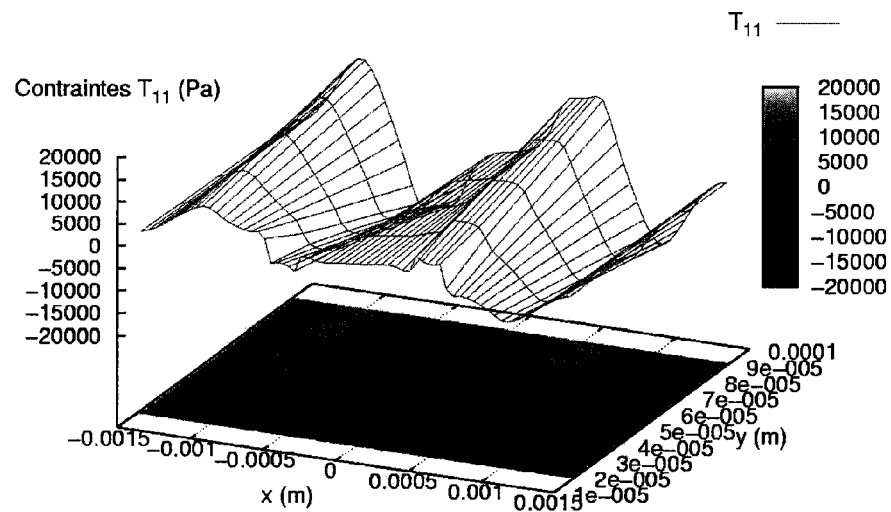
FIGS. 13D, 13E show the distribution of the stresses in the head of the nail of FIG. 13A, subjected to a radial force in relation to the head, of positive sign and of negative sign.
Figure 13E:
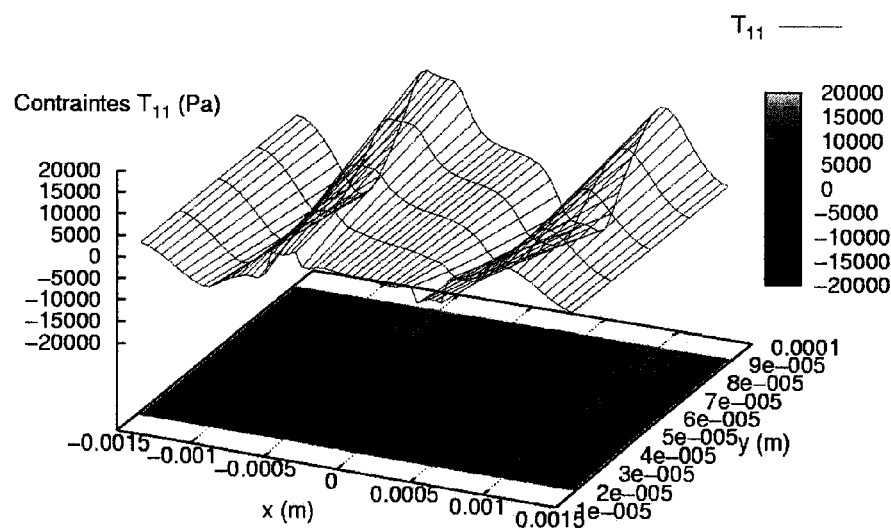

FIG. 13A shows a configuration of the force sensor according to the invention wherein the stress gauges J, in other words the piezoelectric transducers 10 and the reflecting portions 40 imbedded in the head 51, are situated near to the stem 50, they overhang it partially. It may be shown by calculation that the stresses are maximal at these points.

It is obviously possible to place one or more stress gauges J near to the stem 50 and one or more near to the anchoring points 52.

FIGS. 12B, 12C, 12D, 12E represent respectively the stress $T_{11}$ originating in the head 51 for a force directed along +y (corresponding to x2 in the previous model, see equations (1) to (17)), −y, +x (corresponding to x1 in the previous model, see equations (1) to (17)) and −x in the configuration of FIG. 12A, with the stress gauges of the anchoring points side.

FIGS. 13B, 13C, 13D, 13E represent respectively the stress $T_{11}$ originating in the head for a force directed along +y, −y, +x and −x in the configuration of FIG. 13A, with the stress gauges of the stem side.

With two useful stress gauges and a reference stress gauge arranged in an area insensitive to the stresses, the nature and the orientation of the forces that apply on the holder may be well determined. The change of sign is passed on well and without ambiguity for a radial force along x.

The results show that there is no particular difference between the two positions near to the stem or near to the anchoring points. Thus it is the technological difficulty or the choice of a specific detection strategy that will govern the localisation of the transducers.

To detect the three sought after stress terms $\sigma_{zz}$ $\tau_{zx}$ $\tau_{zy}$ (corresponding to $T_{22}$, $T_{21}$ and $T_{23}$ in the previous model, see equations (1) to (17)), at least four stress gauges and even five could be used. Such a number of stress gauges may prove to be critical for a transponder application at the central frequency of 433.92 MHz given the narrowness of the useful band allotted around this frequency, which is 1.74 MHz. This will be more realistic at the central frequency of 2.44 GHz since the useful band allotted extends over 83.5 MHz, it will be easier to accommodate the frequencies of the different piezoelectric transducers in this useful band.

Figure 14A:
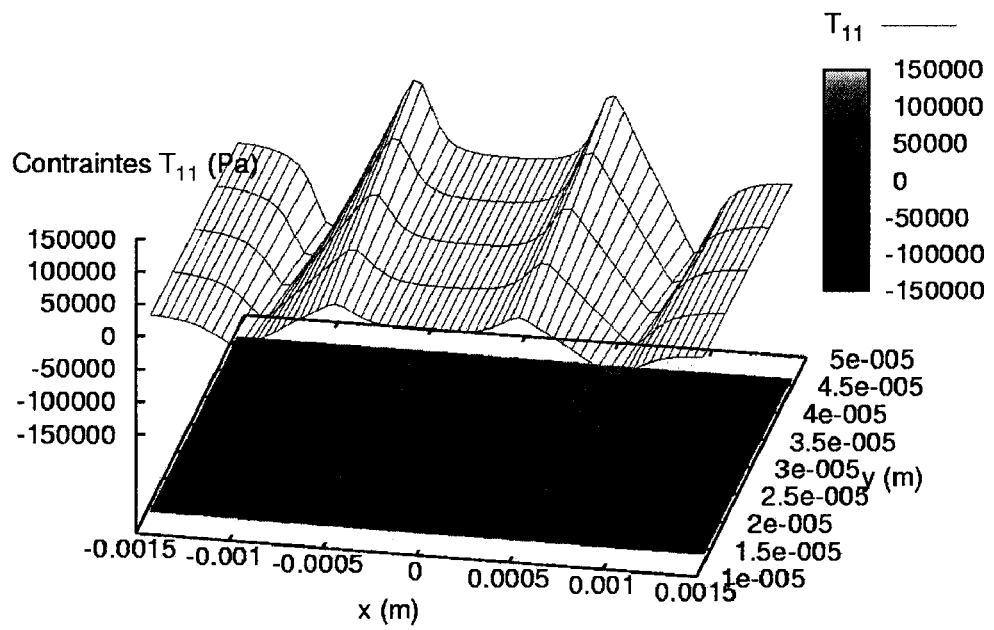
FIG. 14A shows the distribution of the stresses in the head of the nail, of 100 micrometres thickness, subjected to a radial force of 2 N.

The calculations show that with a head made of monocrystalline silicon, the thickness of which is 100 micrometres and a force along x of 1 N applied to the heel of the nail, it may be expected to obtain an average stress of 7.5 KPa in the material of the resonating portion between the piezoelectric transducer and the reflecting portion. This distance corresponds to the path of the acoustic wave. It should be made clear that the reflecting portion is imbedded at mid-thickness of the head. Taking account of the values of sensitivity to the stress of silicon, a relative frequency variation of $-3.3 \cdot 10^{-8}$ is obtained. To increase the sensitivity of the force sensor, the thickness of the head may be reduced to 100 micrometres by leaving the imbedded reflecting portion at mid thickness. A distribution of the stress $T_{11}$ as illustrated in FIG. 14A is obtained. With such a thickness, the average stress is 37.5 kPa, i.e. five times more than previously. A relative frequency variation of $-1.65 \cdot 10^{-7}$ is attained. By multiplying the dimensions by a factor of two, in other words the surface area of the head, a factor of eight is gained on the average stress and a relative frequency variation of $-1.3 \cdot 10^{-6}$ is obtained.

Figure 14B:
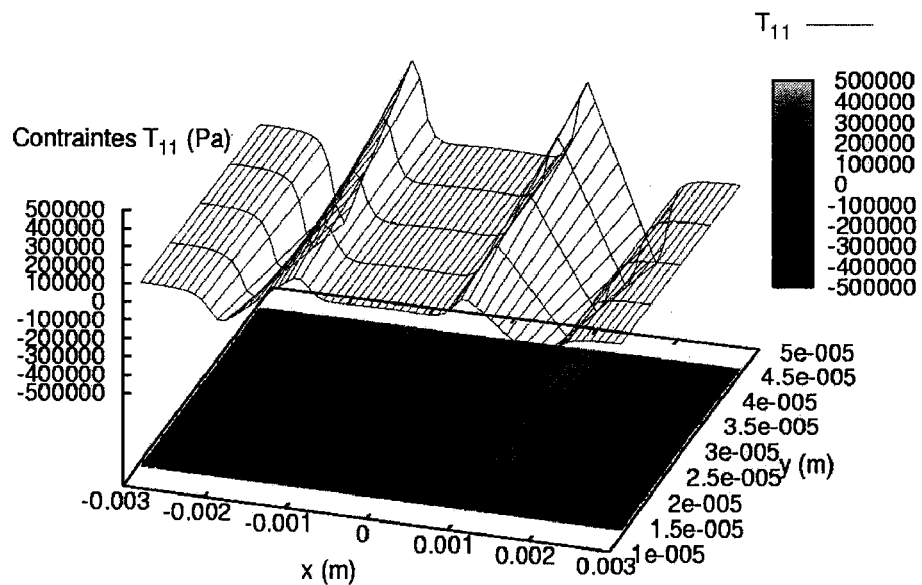
FIG. 14B shows the distribution of the stresses in the head of the nail, of double dimensions subjected to a radial force of 1 N.

Reference may be made to FIG. 14B, which illustrates the distribution of stresses in the head in this latter case.

Figure 15:
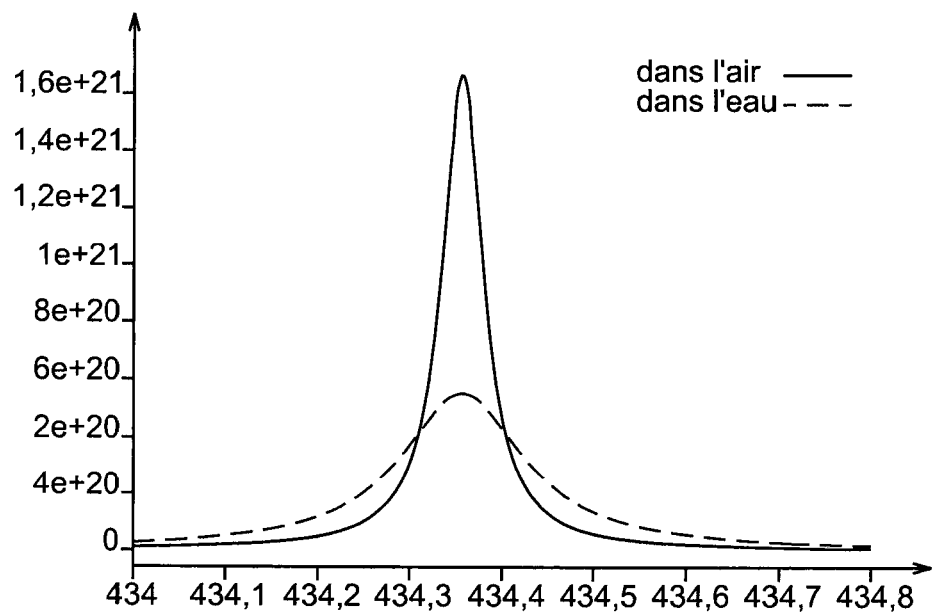
FIG. 15 shows the influence of an organic body on the rear face of a conventional HBAR resonator.

The fact of arranging the reflecting portion 40 imbedded in the holder 20 has the advantage of increasing the sensitivity of the measurement of the stress and protecting the force sensor thereby created vis-à-vis any organic matter, the effect of which would be to absorb the acoustic energy. In FIG. 15, the variations of the conductance for acoustic charges at the rear face of a resonator corresponding to air and water as a function of the frequency has been illustrated. The peaks, expressing the maximum absorption of the acoustic wave, are situated at around 434.35 MHz.

A method of forming a sensor of at least one physical parameter according to the invention, the holder of which is of nail type, will now be described.

The formation of the reflecting portion is a critical factor for the functioning of the sensor, the holder of which is of nail type, because it is necessary to properly control the thickness of the head between the stem 51 and the anchoring points 52 to obtain a desired sensitivity.

An SOI (silicon on insulator) substrate with a thick layer of silicon referenced 201, a less thick layer of silicon referenced 203 and an electrically insulating layer between the two silicon layers referenced 202 may be employed. Reference is made to FIG. 10C.

During the formation of the holder, the reflecting portion 40 is formed by etching at the level of the insulating layer 202. The stem 50 and the anchoring points 52 are machined in the thickest silicon layer 201 on which is formed the insulating layer 202.

The piezoelectric transducers 10 are formed on the thinnest silicon layer 203 that surmounts the insulating layer 202 and which is transferred onto the thickest silicon layer 201.

The adjustment of the thickness of the head between the stem 50 and the anchoring points 52 risks being difficult, it is conditioned by the duration of the machining during the formation of the stem 50 and anchoring points 52. There is a risk of encountering problems of lack of precision and lack of reproducibility.

In an alternative, it is possible to use a SOI substrate 201 to 203 to form the stem 50, the anchoring points 52 and only a portion of the head 51 of the nail. The machining of the stem 50 and anchoring points 52 is carried out in the thickest silicon layer 201 by using the insulating layer 202 as stop layer.

The thickness of the membrane or arms from the stem 50 side up to the reflecting portions 40 is perfectly controlled because it corresponds to that of the thinnest silicon layer 203 of the SOI substrate.

Figure 16A:
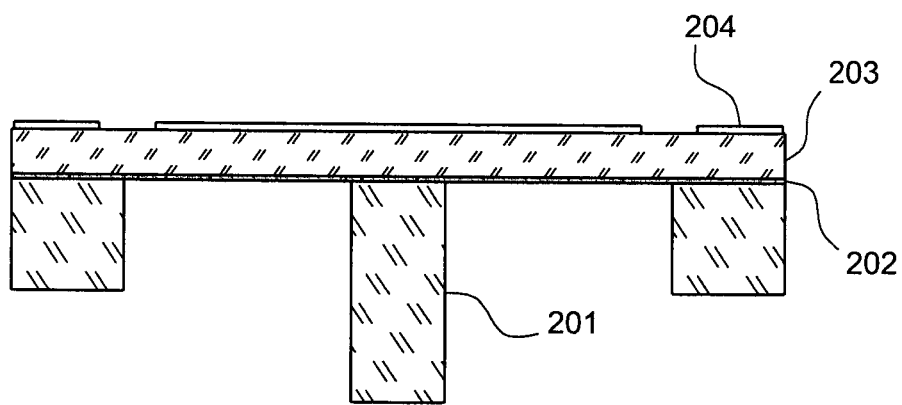
FIGS. 16A, 16B, 16C show steps of a method of forming a stress gauge according to the invention.

The reflecting portions 40 are formed on an insulating layer 204 formed from the thinnest silicon layer 203. It may be thermal oxide. Reference is made to FIG. 16A.

Figure 16B:
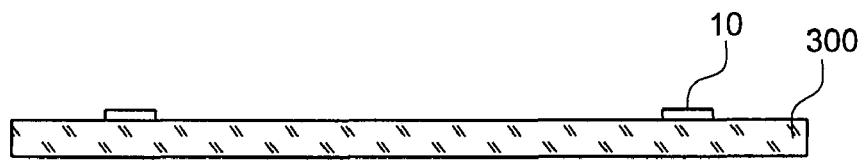

On a second substrate 300, the piezoelectric transducers 10 (FIG. 16B) are formed.

A known method of forming the piezoelectric film transducer is to put in place on the second holder 300 a first electrode 10.2 for example by epitaxy, by cathodic sputtering or by thermal evaporation, then depositing above the piezoelectric film 10.1 by cathodic sputtering, by organometallic chemical vapour deposition, by molecular beam epitaxy, for example, finally to deposit the other electrode 10.3 like the first.

Figure 16C:
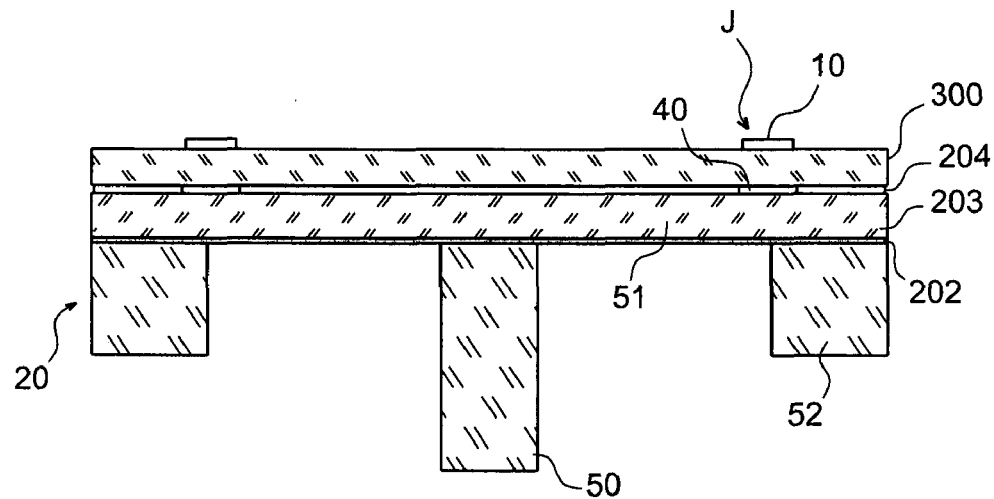

The second substrate 300 is assembled to the first substrate by placing the reflecting portions 40 at the interface between the two substrates 201 to 203 and 300 and the piezoelectric transducers 10 at the surface (FIG. 16C). The assembly may take place by molecular assembly, by thermo-compression of a ductile layer or other.

Figure 17A:
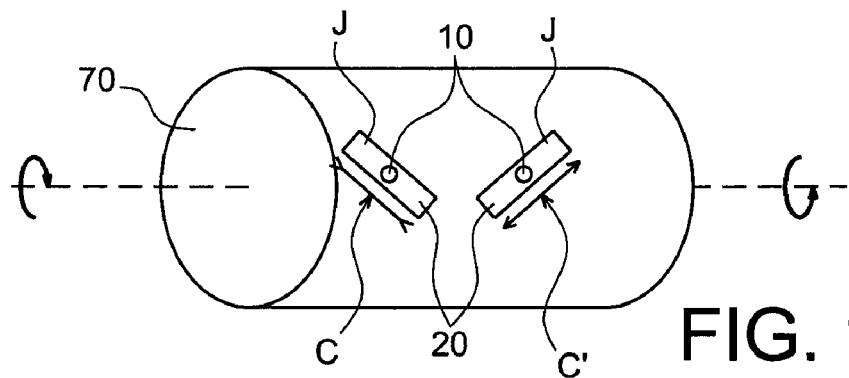
FIGS. 17A, 17B, 17C show two associated force sensors with one stress gauge according to the invention for the measurement of a torque and two examples of torque sensors according to the invention with several stress gauges for the measurement of a torque.
Figure 17B:
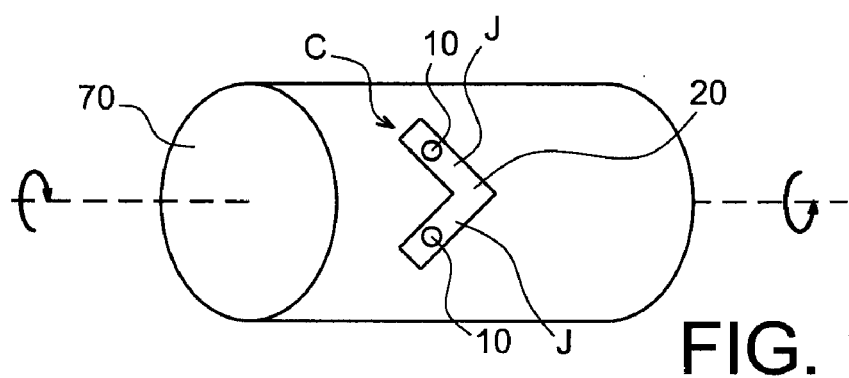
Figure 17C:
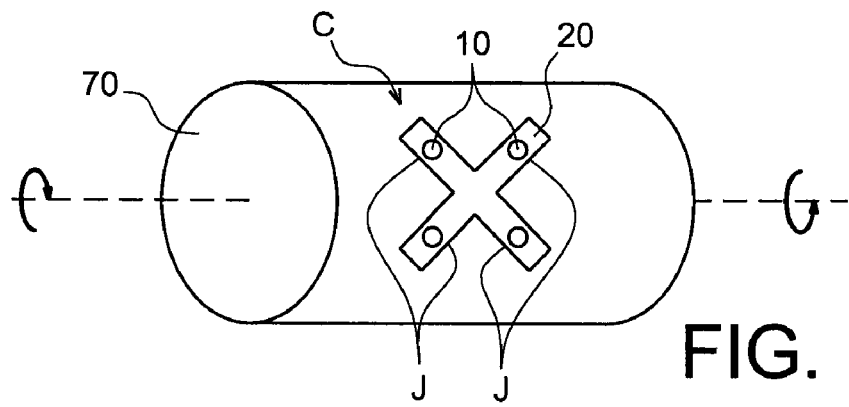

Several sensors of at least one physical parameter may be used, each provided with a single stress gauge according to the invention or a sensor of at least one physical parameter with several stress gauges on a same holder as torque measurement device. Reference is made to FIGS. 17A, 17B, 17C, which show such a torque measurement.

At least two stress gauges are necessary to measure a torque, one will measure extension stresses and the other will measure compression stresses.

Two sensors C, C' of at least one physical parameter may be used according to the invention each having a single stress gauge J, said sensors being fixed to an object 70 subjected to a torsion as illustrated in FIG. 17A. The holders 20 of the two resonating structures are extended leafs, one being subjected to an extension and the other being subjected to a compression. The principal axes of the two holders are substantially orthogonal. The piezoelectric transducers of the stress gauges are schematised by circles 10.

To measure a torque, it is possible to use a single sensor C according to the invention provided with several stress gauges J grouped together on a same holder 20, as illustrated in FIG. 17B or 17C. In FIG. 17B, the holder 20 is a leaf delimited in V, the branches of the V are substantially orthogonal. Each of the stress gauges J is situated on one branch of the V. In FIG. 17C, the holder is of leaf form delimited in X and has four stress gauges J. More specifically, there are four piezoelectric resonators 10, each being arranged on a branch of the X. The branches of the X are substantially orthogonal. A torque sensor with double differential has thus been formed, which makes it possible to reduce the sensitivity to positioning error.

The holders 20 may be formed from a machined silicon. Orthogonality is obtained by lithography and machining and the positioning precision is relatively good. The X structure is particularly robust to positioning error. In these figures, the reflecting portions are not shown.

Such a sensor of at least one physical variable may be used to carry out a measurement of any mechanical quantity that could be expressed by a compression and/or extension effect on the holder such as a force, a pressure, a torque, an acceleration, a gyroscopic effect. In particular, if the stress to be measured in a structure is uniform or of constant sign along its thickness, the stress gauge according to the invention and the sensor, which is provided with at least one such stress gauge, enable a simple and robust transfer onto the structure subjected to the stresses. The imbedding of the reflecting portion makes it possible to isolate the piezoelectric transducer from the holder under stress and to maintain the optimal resonance qualities.

Figure 1:
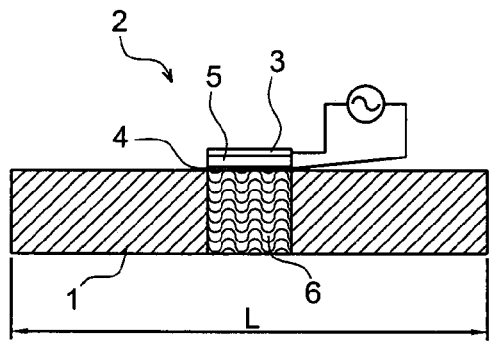
FIG. 1 shows a conventional hybrid resonating structure, the isotropic holder of which is a built-in beam, said assembly not having sufficient sensitivity to serve as stress gauge.
Figure 2:
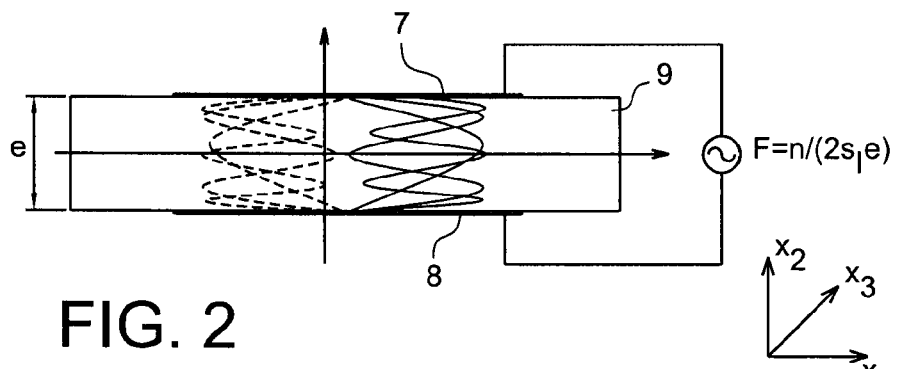
FIG. 2 shows a conventional bulk wave resonator.

Such a sensor of at least one physical parameter has advantages compared to a sensor formed by a conventional bulk acoustic wave resonator such as that illustrated in FIG. 2. In these conventional sensors, a certain number of drawbacks were met. Since a single resonating material was used, for example quartz, to carry out the transduction, this gave few degrees of freedom as regards the conception of the sensor.

The coupling coefficient, which depends on the section retained and conditions at the limits, did not exceed several thousandths.

The frequencies of use remain less than around 100 MHz.

The direct exposure of the two faces of the resonator to stresses could perturb the operation of the sensor itself and accelerate its ageing.

Although several embodiments of the present invention have been represented and described in a detailed manner, it will be understood that different changes and modifications may be made without going beyond the scope of the invention.

The invention claimed is:

1. Stress gauge of the type having an acoustic resonant structure including a piezoelectric transducer (10) connected to one face of a holder (20) subjected to the stress, characterised in that the holder (20) comprises a median neutral fibre (30) situated at a given depth of the face on which is located the piezoelectric transducer and includes opposite the piezoelectric transducer (10) a reflecting portion (40) imbedded in the holder intended to reflect volume acoustic waves generated by the piezoelectric transducer (10) when it is excited according to a harmonic mode of the structure, said acoustic waves propagating into the holder (20) and entering into resonance, said reflecting portion (40) being arranged at a distance from the piezoelectric transducer (10) such that the integral of the stress on the propagation distance of the volume acoustic waves up to their reflection is different from zero, and at the deepest at the depth of the neutral fibre.

2. Stress gauge according to claim 1, wherein the reflecting portion (40) is situated at a depth of around 80% of the depth of the median neutral fibre (30).

3. Stress gauge according to claim 1, wherein the holder (20) is made of silicon, langasite, langanite, langatate, lithium niobate, sapphire, gallium phosphate, lithium tantalate, diamond carbon, silicon carbide, glass, silicon oxide or even a metallic material such as stainless steel.

4. Stress gauge according to claim 1, wherein the piezoelectric transducer (10) is made of aluminium nitride, quartz, lithium niobate, lithium tantalate, potassium niobate, zinc oxide, langasite and derivatives thereof, gallium phosphate, gallium arsenide, gallium nitride, PZT, PMN-PT.

5. Stress gauge according to claim 1, wherein the piezoelectric transducer (10) is a piezoelectric film transducer or a conventional piezoelectric bulk wave transducer.

6. Stress gauge according to claim 1, wherein the reflecting portion (40) is a cavity, a Bragg mirror, a mirror reflecting the acoustic waves whatever their incidence.

7. Stress gauge according to claim 1, wherein the reflecting portion (40) has a size and a form substantially copied from those of the piezoelectric transducer (10).

8. Stress gauge according to claim 1, wherein the reflecting portion (40) has a thickness ($\epsilon$) substantially equal to around ten percent of the thickness ($\Sigma$) of the holder (20) at the level of the piezoelectric transducer (10).

9. Stress gauge according to claim 1, wherein the piezoelectric transducer (10) is crowned by an impedance matching layer (60).

10. Sensor of at least one physical parameter, characterised in that it comprises one or more stress gauges according to claim 1, the stress gauges sharing the same holder when the sensor comprises several stress gauges.

11. Sensor of at least one physical parameter according to claim 10, wherein when it comprises at least two stress gauges, one of the stress gauges is intended to be subjected to an extension stress, the other stress gauge of the sensor is intended to be subjected to a compression stress, said two stress gauges making it possible to carry out a differential measurement so as to be compensated vis-à-vis sources of correlated perturbations such as a temperature variation.

12. Sensor according to claim 10, comprising at least one stress gauge, known as reference gauge, situated in an area of the holder (20) subjected to substantially no stress.

13. Sensor according to one of claims 10 to 12, wherein the holder (20) is a beam, a membrane, a nail, a leaf.

14. Sensor according to claim 13, wherein the holder (20) is a nail with a stem (50) surmounted by a head (51) provided with anchoring points (52) that have a given position in relation to the stem (50) at rest and which keep this position when the stem (50) is stressed, a stress gauge being arranged on the head (51) in the vicinity of the stem (50) or anchoring points (52).

15. Sensor according to claim 13, wherein the holder (20) is a beam built-in at one end and connected to a seismic mass (80) at the other end.

16. Sensor according to claim 10, wherein at least one stress gauge is connected to an antenna (85).

17. Sensor according to claim 10, wherein two stress gauges share a same reflecting portion (40), the reflecting portion (40) being inserted between two piezoelectric transducers (12, 13).

18. Sensor according to claim 10, further comprising, connected to the holder (20), a temperature sensor (61).

19. Sensor according to claim 10, wherein the physical parameter is a force, a pressure, a torque, an acceleration, a gyroscopic effect and if necessary in addition a temperature.

20. Method of manufacturing a stress gauge of the type having an acoustic resonant structure comprising the putting in place of at least one piezoelectric transducer (10) on one face of a holder (20) comprising a median neutral fibre situated at a given depth of the face on which is located the piezoelectric transducer and the formation within the holder (20) of at least one reflecting portion (40) opposite the piezoelectric transducer (10), to reflect volume acoustic waves generated by the piezoelectric transducer (10) when the sensor is stressed, the reflecting portion (40) being imbedded in the holder (10) and situated so that the integral of the stress on the propagation distance of the volume acoustic waves up to their reflection is different from zero, and at the deepest at the depth of the neutral fibre.

21. Method according to claim 20, wherein the holder (20) is formed by the assembly of a first substrate (101) to a second substrate (100), the reflecting portion (40) being formed on or in the first substrate (101) before assembly in such a way that it is at the interface between the two substrates (101, 100) after assembly, the second substrate (100) bearing the piezoelectric transducer (10).

22. Method according to claim 21, wherein when the reflecting portion (40) is a cavity, it is etched in the first substrate (101).

23. Method according to claim 21, wherein the assembly is a bonding with adhesive, an anodic bonding, a bonding by thermo-compression of a ductile layer, a molecular bonding, a bonding by electroforming.

24. Method according to claim 21, wherein the first substrate (201, 202, 203) is a silicon on insulator substrate with an insulating layer (202) sandwiched between two silicon layers (201, 203) of different thicknesses.

25. Method according to claim 24, wherein the holder (20) is delimited in part by machining of the thickest silicon layer (201) and stops on the insulating layer (202).

26. Method according to claim 24, wherein the reflecting portion (40) is put in place on the thinnest silicon layer (203).

27. Method according to claim 20, wherein, when the holder (10) is made of a silicon on insulator substrate with an insulating layer (202) sandwiched between two silicon layers (201, 203) of different thicknesses, the reflecting portion (40) is formed within the insulating layer (202) supported by the thickest silicon layer (201) and the piezoelectric transducer (10) is formed on the thinnest silicon layer (203), which is brought back onto the insulating layer (202).

\* \* \* \* \*

UNITED STATES PATENT AND TRADEMARK OFFICE
CERTIFICATE OF CORRECTION

PATENT NO. : 8,393,224 B2
APPLICATION NO. : 12/669256
DATED : March 12, 2013
INVENTOR(S) : Sylvain Jean Ballandras et al.

It is certified that error appears in the above-identified patent and that said Letters Patent is hereby corrected as shown below:

On the Title Page, Item (75), 2nd named inventor, please delete "Jérérmy" and add -- Jérémy --

In the specification, column 1, line 56, please add -- 9 -- after "block"

In the specification, column 2, line 28, please add -- with I, J -- before "varying"

In the specification, column 5, line 12, please delete
"$\vec{H}_{ijkl} = (\delta_{ik}\delta_{js}\delta_{lt} + C_{ijkluv}S_{uvst} + C_{pjkl}S_{ipkl} + C_{ijql}S_{kqst})\vec{T}_{st} = K_{ijkls}\vec{T}_{st}$" and add
-- $\overline{H}_{ijkl} = (\delta_{ik}\delta_{js}\delta_{lt} + C_{ijkluv}S_{uvst} + C_{pjkl}S_{ipkl} + C_{ijql}S_{kqst})\overline{T}_{st} = K_{ijklst}\overline{T}_{st}$ --

In the specification, column 9, line 63, please add -- 10 -- after "transducer"

In the specification, column 10, line 55, please add -- 21 -- before "but"

In the specification, column 11, line 22, please add -- 10 -- after "transducer"

In the specification, column 11, line 27, please add -- 40 -- after "portion"

In the specification, column 11, line 65, please remove -- , -- after "This"

In the specification, column 11, line 65, please add -- 60 -- after "layer"

In the specification, column 12, line 35, please delete "s-of" and add -- $\Sigma$ of --

In the specification, column 17, line 53, please add -- 51 -- after "head"

In the specification, column 18, line 35, please add -- 20 -- after "holders"

Signed and Sealed this
Fourth Day of June, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,393,224 B2  Page 1 of 1
APPLICATION NO. : 12/669256
DATED : March 12, 2013
INVENTOR(S) : Ballandras et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 397 days.

Signed and Sealed this
First Day of September, 2015

Michelle K. Lee
*Director of the United States Patent and Trademark Office*